(12) United States Patent
Kamata

(10) Patent No.: US 7,976,229 B2
(45) Date of Patent: Jul. 12, 2011

(54) LENS BARRIER DEVICE, LENS BARREL, AND IMAGING DEVICE

(75) Inventor: Yoshiyuki Kamata, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/653,568

(22) Filed: Dec. 16, 2009

(65) Prior Publication Data

US 2010/0166415 A1   Jul. 1, 2010

(30) Foreign Application Priority Data

Dec. 25, 2008   (JP) ................. P2008-330419

(51) Int. Cl.
*G03B 17/00* (2006.01)

(52) U.S. Cl. ....................................... 396/448

(58) Field of Classification Search .................... 396/448
See application file for complete search history.

(56) References Cited

U.S. PATENT DOCUMENTS

| | | | | |
|---|---|---|---|---|
| 4,989,027 A * | 1/1991 | Ishii et al. | ...... | 396/448 |
| 5,486,889 A * | 1/1996 | Shintani | ...... | 396/448 |
| 5,602,607 A * | 2/1997 | Kato et al. | ...... | 396/349 |
| 6,164,842 A * | 12/2000 | Ohta et al. | ...... | 396/349 |
| 6,312,168 B1 * | 11/2001 | Naruse et al. | ...... | 396/349 |
| 6,663,300 B2 * | 12/2003 | Nagae | ...... | 396/448 |
| 6,733,191 B2 * | 5/2004 | Oh et al. | ...... | 396/448 |
| 7,128,480 B2 * | 10/2006 | Tanaka et al. | ...... | 396/448 |
| RE39,752 E * | 7/2007 | Nomura et al. | ...... | 396/448 |
| 7,628,553 B2 * | 12/2009 | Miyoshi | ...... | 396/448 |
| 2001/0024573 A1 | 9/2001 | Nomura et al. | | |
| 2003/0049031 A1 | 3/2003 | Nagae | | |
| 2005/0135799 A1 * | 6/2005 | Tanaka et al. | ...... | 396/448 |
| 2007/0196102 A1 * | 8/2007 | Miyoshi | ...... | 396/448 |
| 2010/0027986 A1 * | 2/2010 | Katano | ...... | 396/448 |

FOREIGN PATENT DOCUMENTS

| | | |
|---|---|---|
| JP | 01169227 A | 7/1989 |
| JP | 07020536 A | 1/1995 |
| JP | 09068737 A | 3/1997 |
| JP | 09211536 A | 8/1997 |
| JP | 10-301160 A | 11/1998 |
| JP | 10312003 A | 11/1998 |
| JP | 11015043 A | 1/1999 |
| JP | 2000231140 A | 8/2000 |
| JP | 2002-148682 A | 5/2002 |
| JP | 2005-106934 A | 4/2005 |

OTHER PUBLICATIONS

European Search Report, EP 09180495, dated Feb. 18, 2010.
Office Action from Japanese Application No. 2008-330419, dated Aug. 5, 2010.

* cited by examiner

*Primary Examiner* — Rodney E Fuller
(74) *Attorney, Agent, or Firm* — Lerner, David, Littenberg, Krumholz & Mentlik, LLP

(57) ABSTRACT

A lens barrier device includes: a plurality of barrier blades disposed in an oscillatable manner in front of an imaging lens positioned in closest proximity to a subject side in an imaging optical system; and an oscillating mechanism that allows the plurality of barrier blades to oscillate so as to form a fully closed state in which an optical path of the imaging optical system is fully closed and a fully opened state in which the optical path is fully opened by the barrier blades. The oscillating mechanism includes a drive ring that is provided in an inversely rotatable manner within a predetermined angular range about an optical axis of the imaging optical system and allows the plurality of barrier blades to oscillate back and forth to form the fully closed state and the fully opened state by rotating forward and backward.

7 Claims, 20 Drawing Sheets

ND IMAGING DEVICE

LENS BARRIER DEVICE, LENS BARREL, AND IMAGING DEVICE

CROSS-REFERENCE TO RELATED APPLICATION

The present application claims priority from Japanese Patent Application No. JP 2008-330419 filed in the Japanese Patent Office on Dec. 25, 2008, the entire content of which is incorporated herein by reference.

BACKGROUND OF THE INVENTION

1. Field of the Invention

The present invention relates to a lens barrier device, a lens barrel, and an imaging device.

2. Description of Related Art

For an imaging lens positioned in closest proximity to a subject side in the imaging optical system included in an imaging device, such as a video camera, there has been proposed a lens barrier device that protects the imaging lens from dirt and flaws.

For example, a lens barrier device including a plurality of barrier blades and an oscillating mechanism is described in JP-A-2002-148682.

In this lens barrier device, a plurality of barrier blades are disposed in front of the imaging lens and supported in an oscillatible manner. The oscillating mechanism allows the respective barrier blades to oscillate back and forth between the close position at which they block the optical path and the open position at which they open the optical path.

SUMMARY OF THE INVENTION

However, when an object or a finger accidentally touches the barrier blades while the barrier blades are maintained at the close position and the barrier blades are directly and forcedly moved from the close position to the open position, an unreasonable force acts on the members forming the oscillating mechanism and these members may possibly be damaged.

Accordingly, a manner as to how damages on the oscillating mechanism are prevented when the barrier blades are directly and forcedly moved from the close position to the open position is a critical issue for the lens barrier device.

It is therefore desirable to provide a lens barrier device, a lens barrel, and an imaging device capable of preventing damages on the members and advantageous in enhancing durability.

According to an embodiment of the present invention, there is provided a lens barrier device including a plurality of barrier blades disposed in an oscillatible manner in front of an imaging lens positioned in closest proximity to a subject side in an imaging optical system and an oscillating mechanism that allows the plurality of barrier blades to oscillate so as to form a fully closed state in which an optical path of the imaging optical system is fully closed and a fully opened state in which the optical path is fully opened by the barrier blades. The oscillating mechanism includes a drive ring that is provided in an inversely rotatable manner within a predetermined angular range about an optical axis of the imaging optical system and allows the plurality of barrier blades to oscillate back and forth to form the fully closed state and the fully opened state by rotating forward and backward. The drive ring includes a main body portion that extends in a ring shape around the optical axis and a plurality of coupling portions that are provided to the main body portion and coupled to the respective barrier blades so as to allow the respective barrier blades to oscillate back and forth between a close position at which the fully closed state is formed and an open position at which the fully opened state is formed in association with forward and backward rotations of the main body portion and undergo elastic deformation when the respective barrier blades are directly forced to oscillate from the close position to the open position.

According to another embodiment of the present invention, there is provided a lens barrel including a barrel portion that accommodates an imaging optical system and a lens barrier device. The lens barrier device includes a plurality of barrier blades disposed in an oscillatible manner in front of an imaging lens positioned in closest proximity to a subject side in the imaging optical system and an oscillating mechanism that allows the plurality of barrier blades to oscillate so as to form a fully closed state in which an optical path of the imaging optical system is fully closed and a fully opened state in which the optical path is fully opened by the barrier blades. The oscillating mechanism includes a drive ring that is provided in an inversely rotatable manner within a predetermined angular range about an optical axis of the imaging optical system and allows the plurality of barrier blades to oscillate back and forth to form the fully closed state and the fully opened state by rotating forward and backward. The drive ring includes a main body portion that extends in a ring shape around the optical axis and a plurality of coupling portions that are provided to the main body portion and coupled to the respective barrier blades so as to allow the respective barrier blades to oscillate back and forth between a close position at which the fully closed state is formed and an open position at which the fully opened state is formed in association with forward and backward rotations of the main body portion and undergo elastic deformation when the respective barrier blades are directly forced to oscillate from the close position to the open position.

According to still another embodiment of the present invention, there is provided an imaging device including an imaging optical system, a lens barrier device, and a lens barrel having a barrel portion that accommodates the imaging optical system and the lens barrier device. The lens barrier device includes a plurality of barrier blades disposed in an oscillatible manner in front of an imaging lens positioned in closest proximity to a subject side in the imaging optical system and an oscillating mechanism that allows the plurality of barrier blades to oscillate so as to form a fully closed state in which an optical path of the imaging optical system is fully closed and a fully opened state in which the optical path is fully opened by the barrier blades. The oscillating mechanism includes a drive ring that is provided in an inversely rotatable manner within a predetermined angular range about an optical axis of the imaging optical system and allows the plurality of barrier blades to oscillate back and forth to form the fully closed state and the fully opened state by rotating forward and backward. The drive ring includes a main body portion that extends in a ring shape around the optical axis and a plurality of coupling portions that are provided to the main body portion and coupled to the respective barrier blades so as to allow the respective barrier blades to oscillate back and forth between a close position at which the fully closed state is formed and an open position at which the fully opened state is formed in association with forward and backward rotations of the main body portion and undergo elastic deformation when the respective barrier blades are directly forced to oscillate from the close position to the open position.

According to the embodiments of the present invention, in a case where an external force of some sort acts on the barrier blades positioned at the close position and the barrier blades are forced to oscillate to the open position, the external force is absorbed by elastic deformation of the coupling portions of the drive ring.

It thus becomes possible to prevent damages on members included in the oscillating mechanism, such as the drive ring, which is advantageous in enhancing the durability.

DESCRIPTION OF THE PREFERRED EMBODIMENTS

Hereinafter, embodiments according to the present invention will be described with reference to the drawings.

Figure 1:
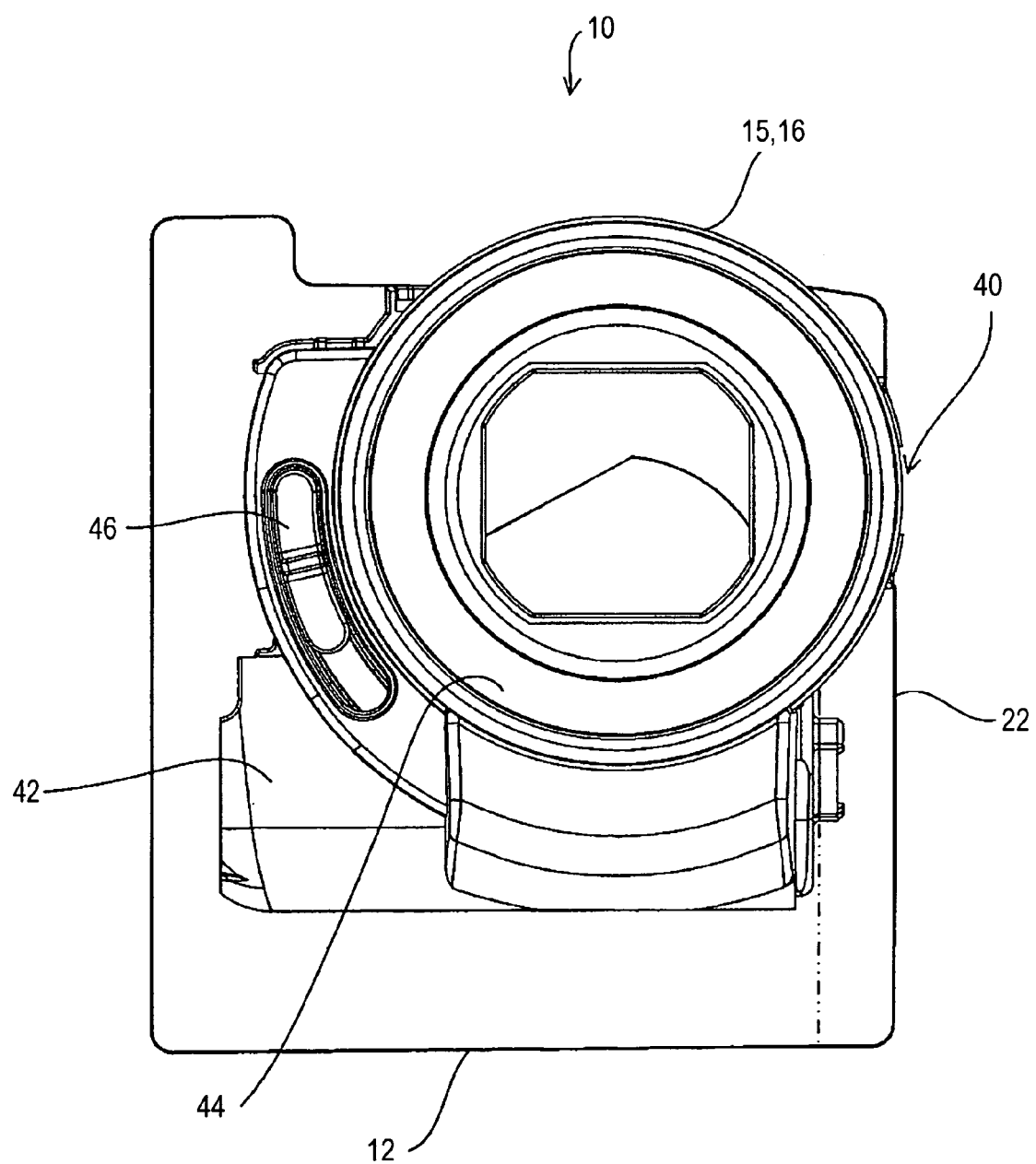
FIG. 1 is a front view of an imaging device according to an embodiment of the present invention.
Figure 2:
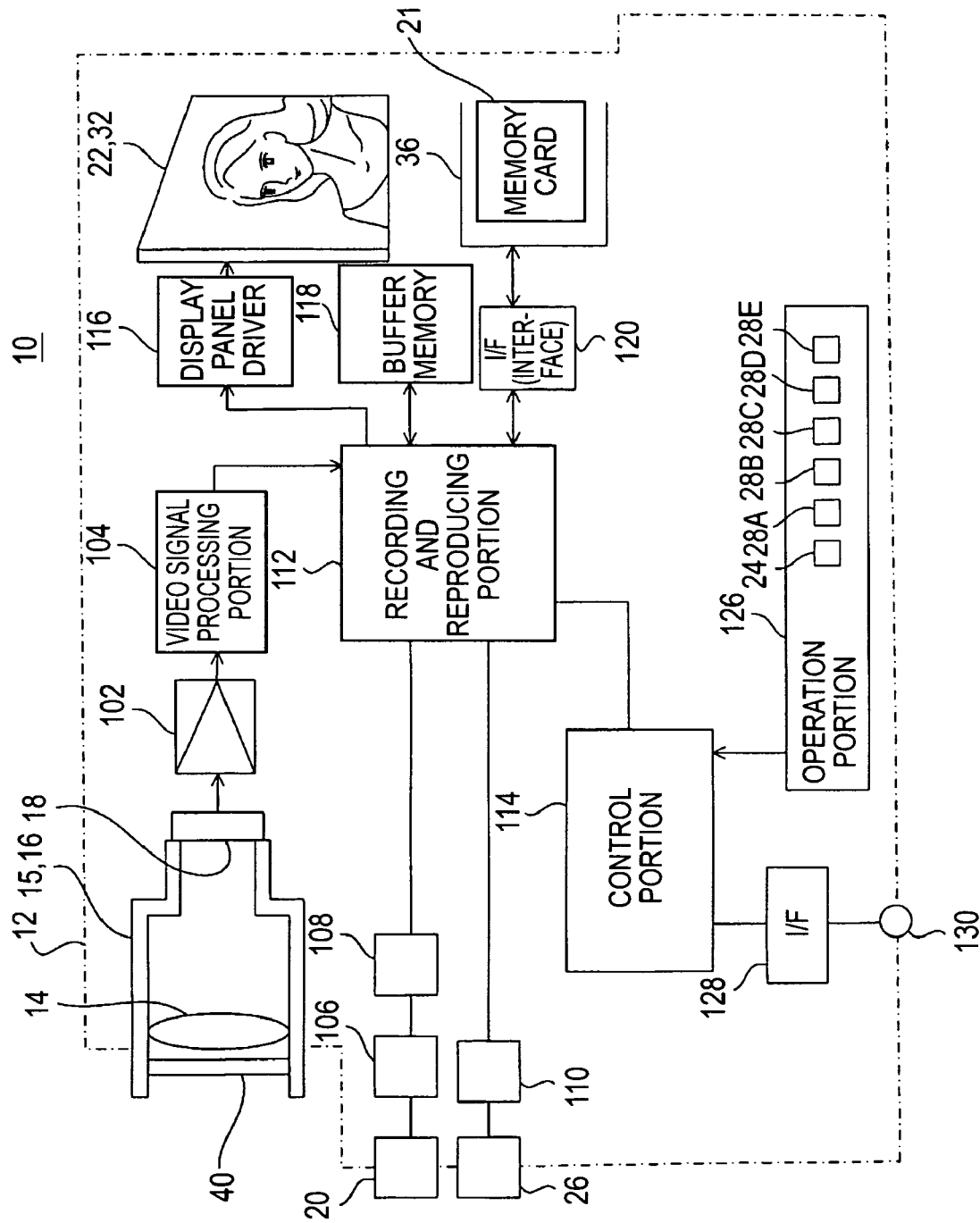
FIG. 2 is a block diagram showing the configuration of a control system of the imaging device.

FIG. 1 is a front view of an imaging device 10 according to an embodiment of the present invention and FIG. 2 is a block diagram showing the configuration of a control system of the imaging device 10.

Herein, the imaging device 10 is a video camera and it records data, such as captured moving images, still images, and sounds, into a recording medium and reproduces the data from the recording medium.

Descriptions will be given herein to a case where a memory card 21, which is a plate-shape or a rod-shape recording medium, is used as the recording medium. It goes without saying, however, that a magnetic recording tape, an optical disc, and a hard disk device can be also used as the recording medium and which type of recording medium will be used is the user's option.

As are shown in FIG. 1 and FIG. 2, the imaging device 10 has a housing 12 that forms the armor and the housing 12 has a barrel portion 15.

The barrel portion 15 accommodates an imaging optical system 14 as well as an imaging element 18 and a lens barrier device 40 described below. The imaging optical system 14, the imaging element 18, the lens barrier device 40, and the barrel portion 15 together form a lens barrel 16.

At the rear end of the barrel portion 15 is provided the imaging element 18 that captures a subject image guided by the imaging optical system 14.

The lens barrier device 40 described below is incorporated into the barrel portion 15.

Also, as is shown in FIG. 2, the imaging device 10 includes a microphone 20, a display panel 22, a speaker 26, a video signal amplifier portion 102, a video signal processing portion 104, a microphone amplifier portion 106, a sound signal processing portion 108, an output amplifier portion 110, a recording and reproducing portion 112, and a control portion 114.

The imaging device 10 further includes a display panel driver 116, a buffer memory 118, a memory card interface 120, an operation portion 126, an external input and output interface 128, an external input and output terminal 130, and so forth.

An imaging signal generated in the imaging element 18 is amplified by the video signal amplifier portion 102 and supplied to the video signal processing portion 104.

The video signal processing portion 104 generates moving image data and still image data by applying predetermined signal processing on the imaging signal and supplies the resulting data to the recording and reproducing portion 112.

A sound signal picked up by the microphone 20 is amplified by the microphone amplifier portion 106 and predetermined signal processing is applied thereon by the sound signal processing portion 108. The resulting sound data is supplied to the recording and reproducing portion 112.

As is shown in FIG. 2, the recording and reproducing portion 112 records the moving image data and the still image data supplied from the video signal processing portion 104 and the sound data supplied from the sound signal processing portion 108 into the memory card 21 via the memory card interface 120 under the control or the control portion 114.

Data is recorded into the memory card 21 by the recording and reproducing portion 112, for example, by accumulating data to be recorded into the memory card 21 into the buffer memory 118 first, and thence by writing the data read out from the buffer memory 118 into the memory card 21.

The recording and reproducing portion 112 supplies the moving image data and the still image data supplied from the recording and reproducing portion 112 to the display panel 22 via the display panel driver 116 so that an image is displayed on the display panel 22.

Also, the recording and recording portion 112 supplies the moving image data and the still image data supplied from the memory card 21 via the memory card interface 120 to the display panel 22 via the display panel driver 116 so that an image is displayed on the display panel 22.

Further, the recording and reproducing portion 112 supplies the sound signal supplied from the memory card 21 via the memory card interface 120 to the speaker 26 via the output amplifier portion 110 so that sounds are outputted from the speaker 26.

The external input and output interface 128 converts the sound data and the image data reproduced in the recording and reproducing portion 112 into a predetermined signal format and outputs the resulting signal to an external device, such as a TV set, an HDD recorder, and a personal computer, via the external input and output terminal 130.

As is shown in FIG. 2, the operation portion 126 includes a plurality of operation switches 24, a power supply switch 28A, a still image capturing switch 28B, a zoom switch 28C, a mode switching switch 28D, and a moving image capturing switch 28E.

These switches 24 and 28A through 28E together form an operation switch to perform a variety of functions relating to imaging.

The control portion 114 turns ON and OFF the power supply of the imaging device 10 according to operations on the power supply switch 28A.

The control portion 114 gives commands to the video signal processing portion 104 and the recording and reproducing portion 112 according to operations on the still image capturing switch 28B. The control portion 114 thus recodes the still image data into the memory card 21 by supplying the still image data supplied from the video signal processing portion 104 to the memory card interface 120 via the recording and reproducing portion 112.

The still image capturing switch 28B therefore functions as a shutter button.

The control portion 114 changes a zoom ratio of the imaging optical system 14 by allowing a movable lens in the imaging optical system 14 to move by giving a command to an unillustrated zoom drive portion according to operations on the zoom switch 28C.

The control portion 114 gives a command to the video signal processing portion 104 according to operations on the mode switching switch 28D. The control portion 114 thus switches between a moving image capturing mode in which the moving image data is generated by the video signal processing portion 104 and a still image capturing mode in which the still image data is generated by the video signal processing portion 104.

In the moving image capturing mode, the moving image data generated in the video signal processing portion 104 is recorded into the memory card 21 via the recording and reproducing portion 112. In the still image capturing mode, the still image data generated in the video signal processing portion 104 is recorded into the memory card 21 via the recording and reproducing portion 112.

The control portion 114 starts and stops recording of the moving image data according to operations on the moving image capturing switch 28E.

More specifically, the control portion 114 gives commands to the video signal processing portion 104 and the recording and reproducing portion 112 according to operations on the moving image capturing switch 28E. The control portion 114 thus supplies the moving image data supplied from the video signal processing portion 104 to the memory card interface 120 via the recording and reproducing portion 112. Consequently, the control portion 114 starts or stops an operation to record the moving image data into the memory card 21.

The moving image capturing switch 28E therefore functions as an operation member to start and stop the imaging.

The housing 12 has a length in the front-rear direction and a height in the top-bottom direction larger than a width in the right-left direction. Herein, the right and the left are defined in a state where the imaging device 10 is viewed from the rear and the subject side of the imaging optical system 14 in a direction of the optical axis L is defined as the front and the imaging element side is defined as the rear.

The barrel portion 15 is provided in such a manner that it extends from front to rear in the upper front portion of the housing 12 and the front portion thereof faces the frontal surface of the housing 12. A subject image is therefore guided inside the housing 12 from the front portion of the housing 12.

The imaging element 18 (FIG. 2) is provided at the rear end of the barrel portion 15.

As is shown in FIG. 1, the display panel 22 is provided to the left side portion of the housing 12 in an openable and closable manner.

The display panel 22 includes a display device 32 shown in FIG. 2 and a panel case and it assumes an oblong plate shape.

The display device 32 displays a subject image captured by the imaging element 18.

Herein, the display device 32 is formed of a liquid crystal display device. It should be appreciated, however, that the type of the display device 32 can be selected arbitrarily and, for example, it may be an organic EL display device.

The display panel 22 is coupled to the housing 12 via a hinge in such a manner that a point near one shorter side of the former is coupled to a point on the left side portion near the front portion of the latter.

Consequently, the display panel 22 is coupled to the housing 12 in an oscillatable manner about a first axis line extending in the top-bottom direction of the housing 12 and also in an oscillatable manner about a second axis line orthogonal to the first axis line.

The lens barrier device 40, which is the gist of the present invention, will now be described.

Figure 3:
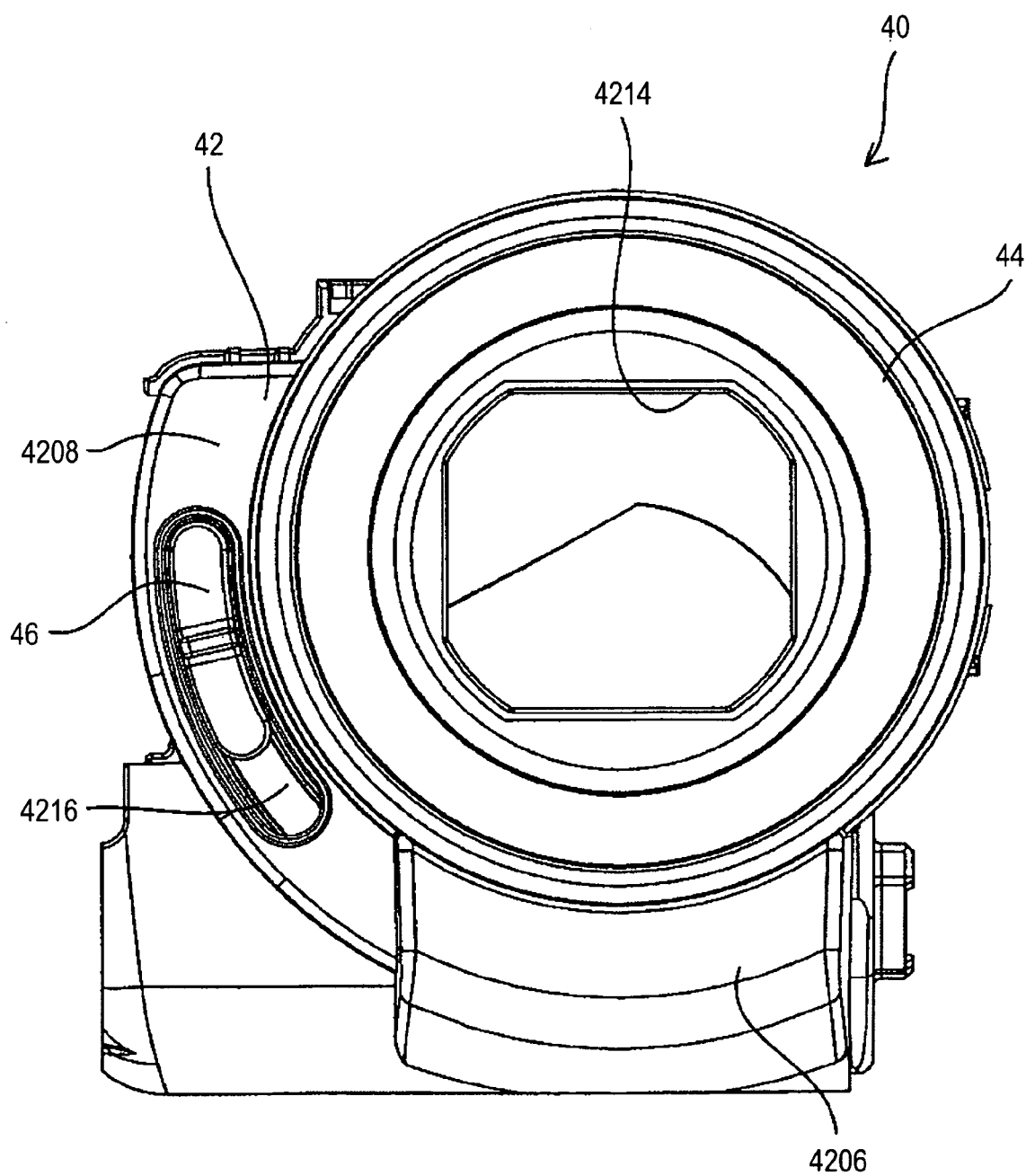
FIG. 3 is a front view of a lens barrier device.

FIG. 3 is a front view of the lens barrier device 40.

Figure 4:
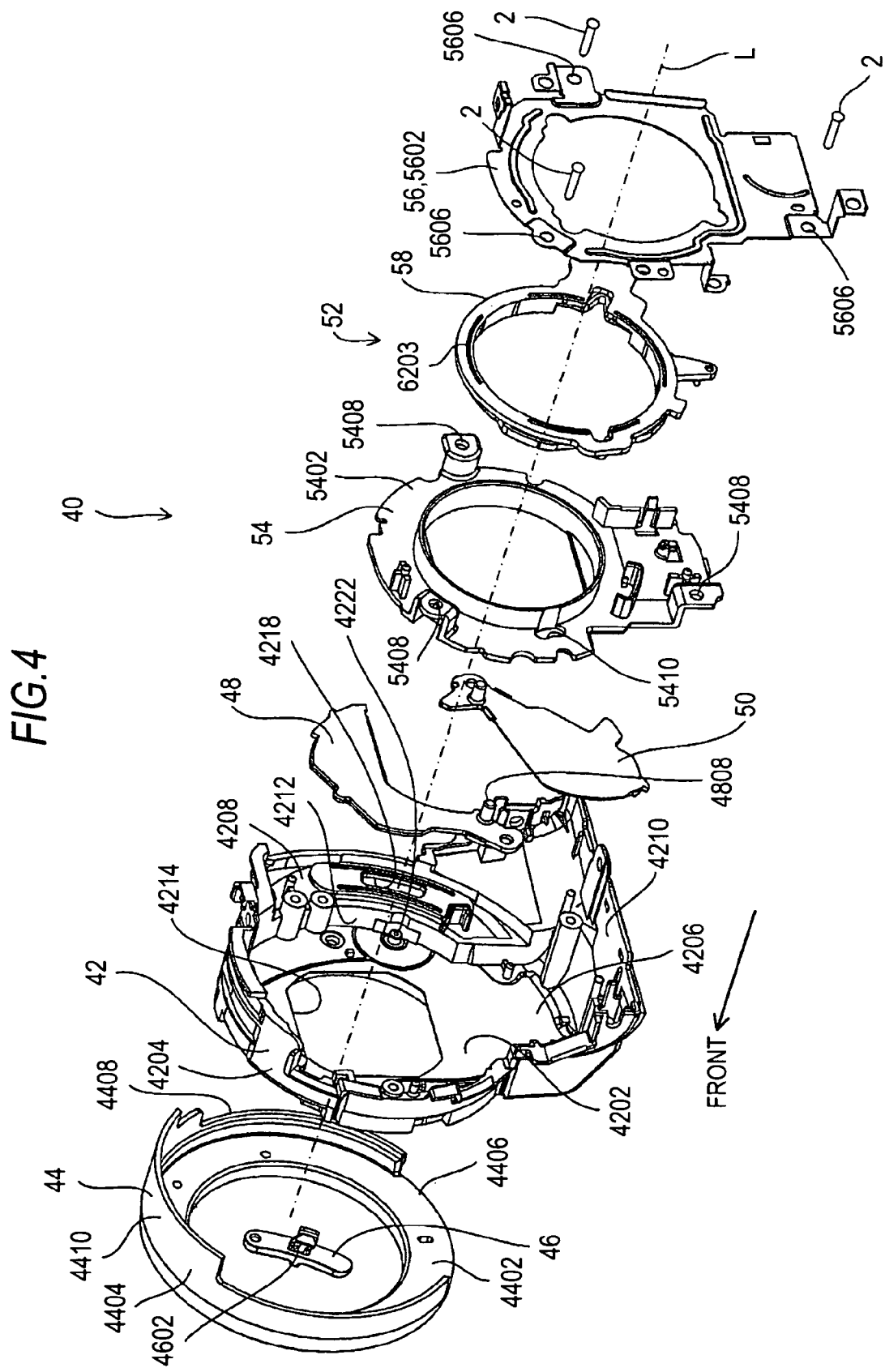
FIG. 4 is an exploded perspective view of the lens barrier device.
Figure 5:
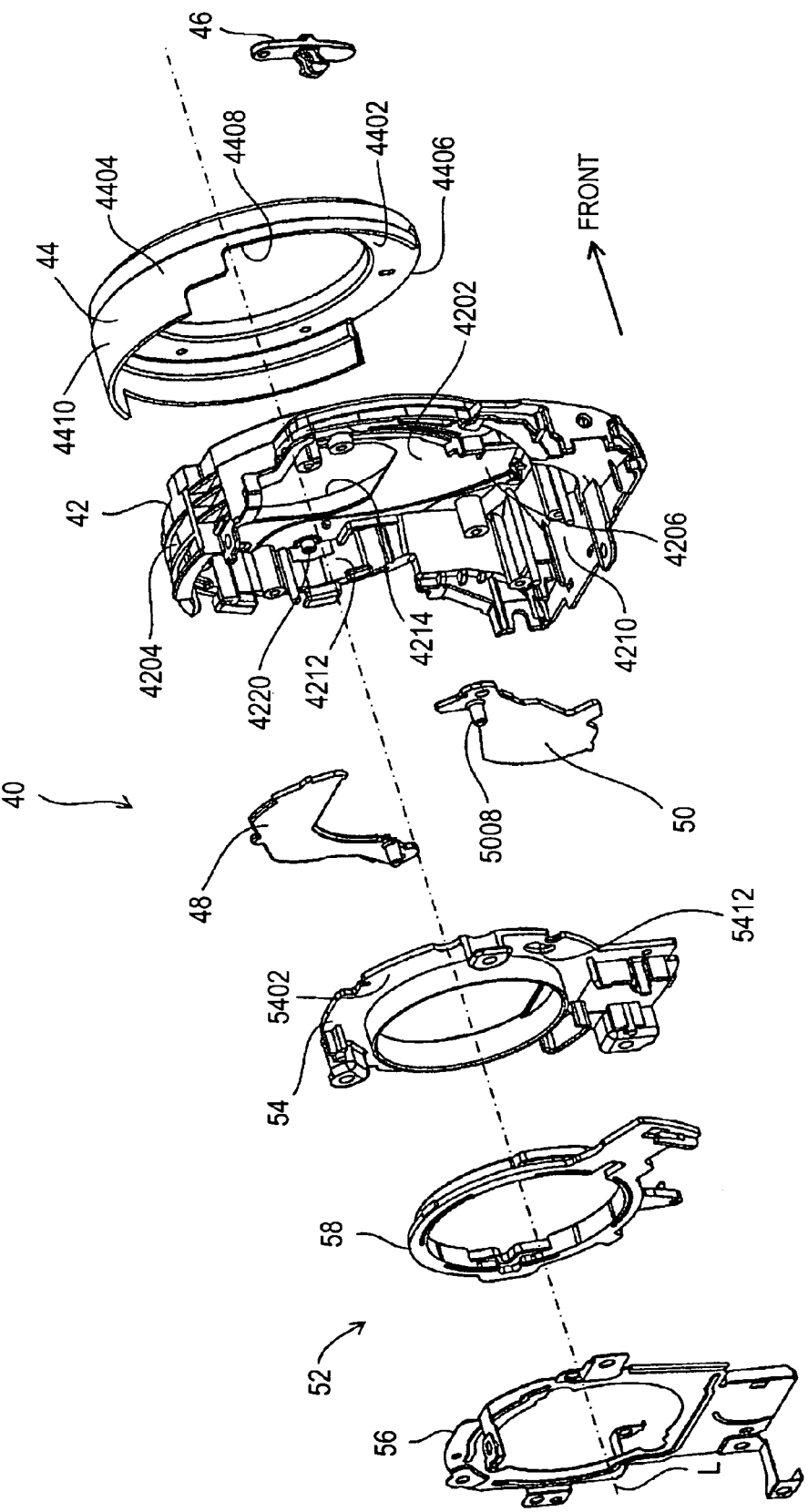
FIG. 5 is another exploded perspective view of the lens barrier device.
Figure 6:
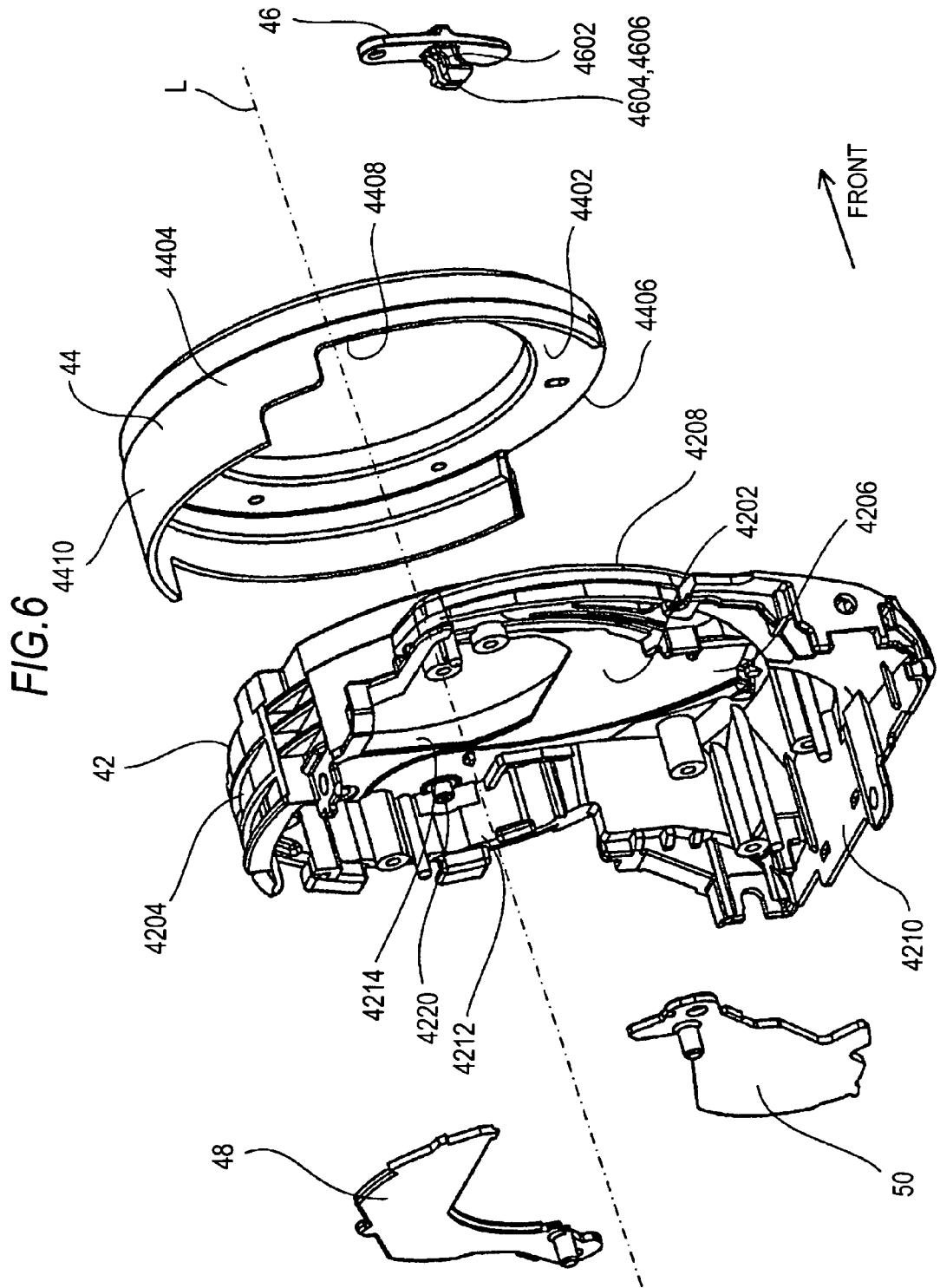
FIG. 6 is a perspective view showing an enlarged part of FIG. 5.

FIG. 4 and FIG. 5 are exploded perspective views of the lens barrier device 40 and FIG. 6 is a perspective view showing an enlarged part of FIG. 5.

Figure 7:
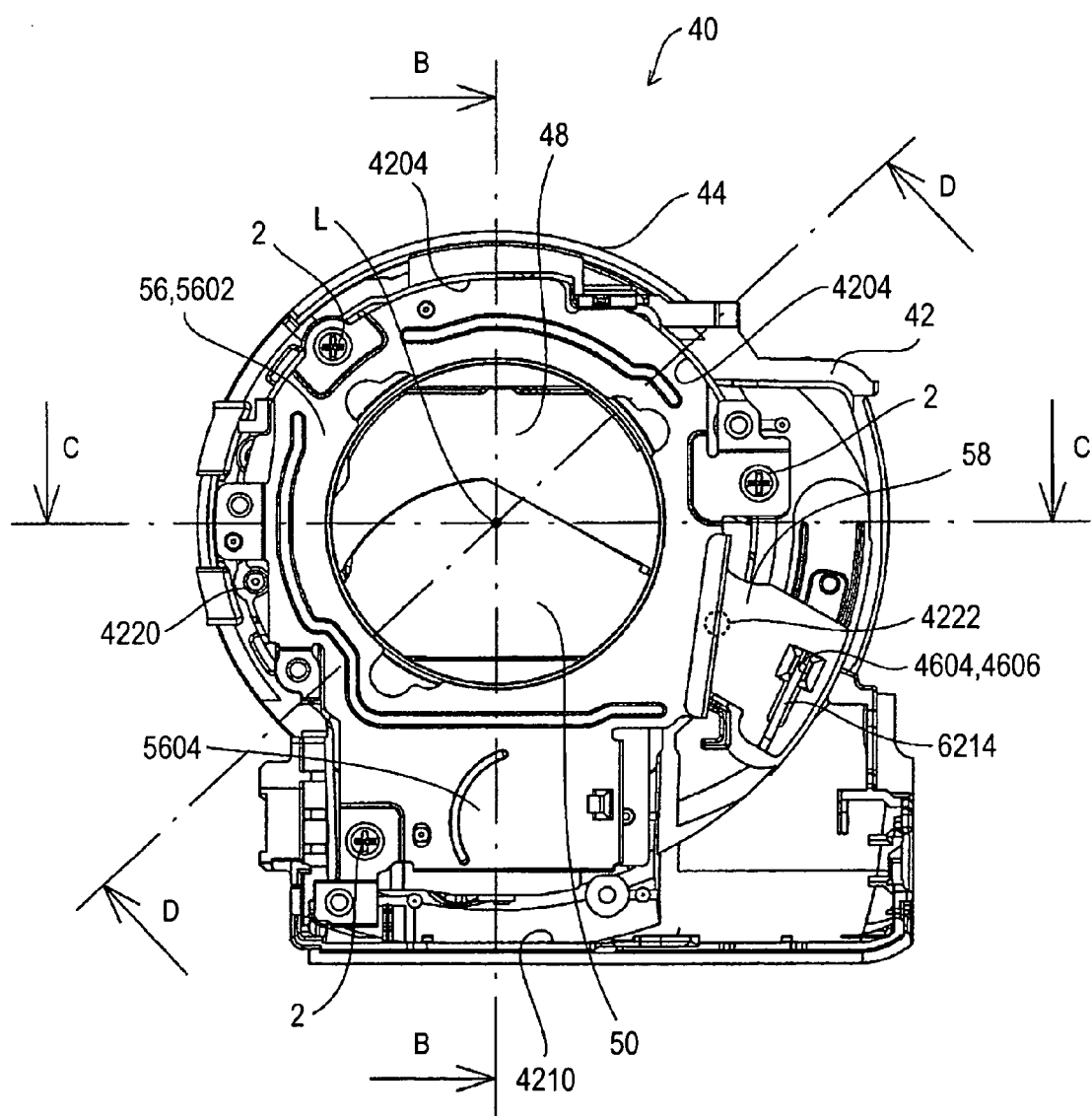
FIG. 7 is a rear view of the lens barrier device.
Figure 8:
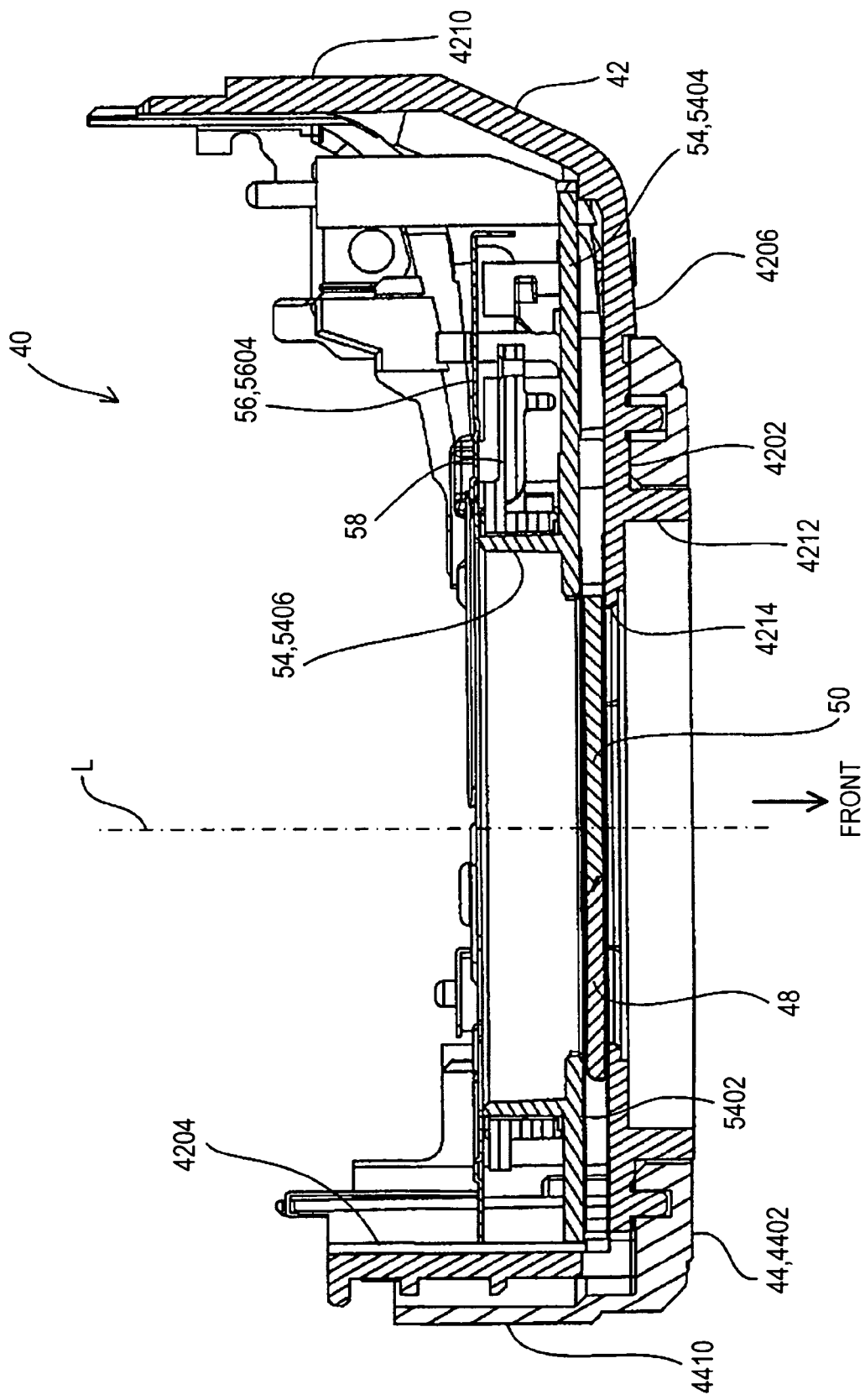
FIG. 8 is a cross section taken on line B-B of FIG. 7.
Figure 9:
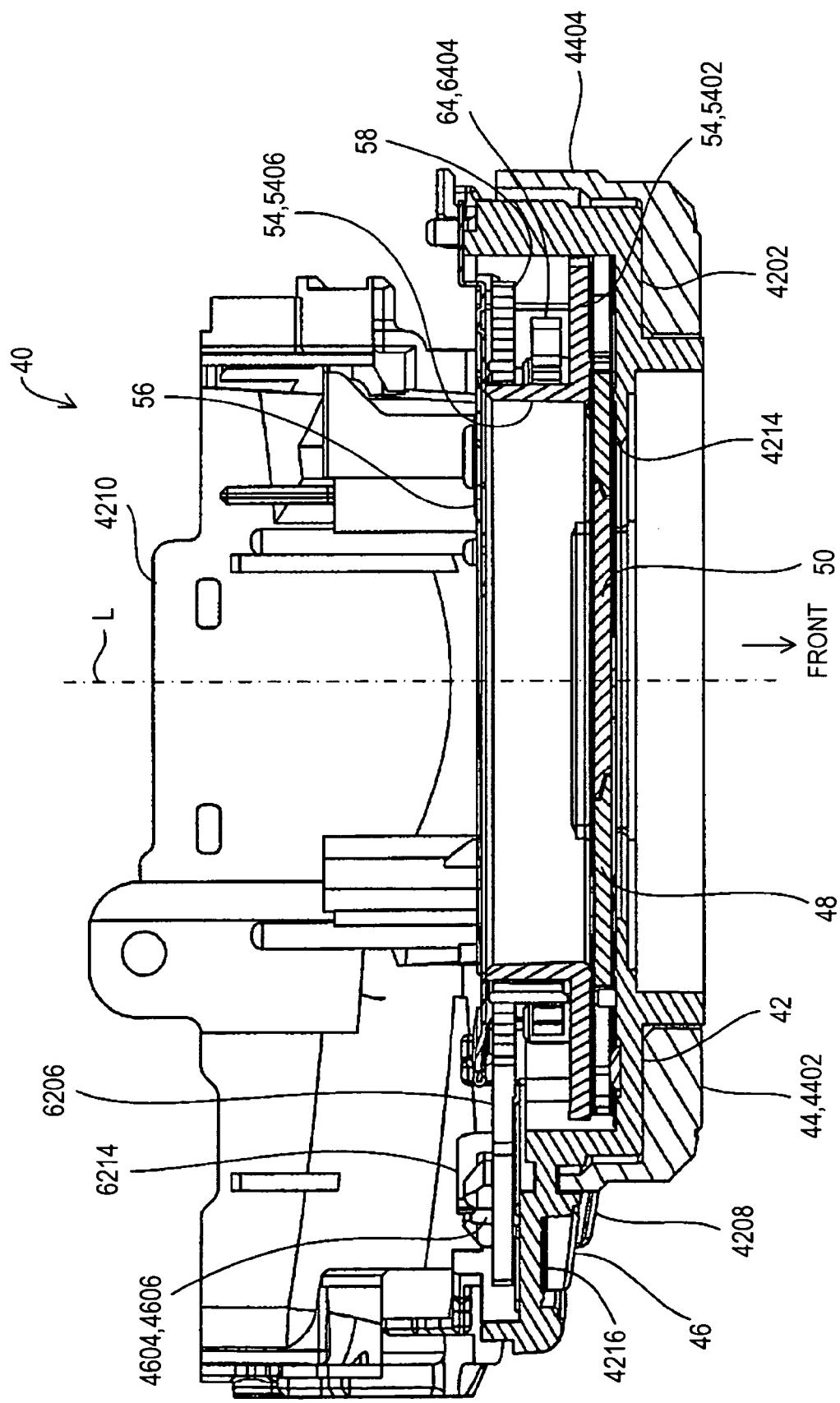
FIG. 9 is a cross section taken on line C-C of FIG. 7.
Figure 10:
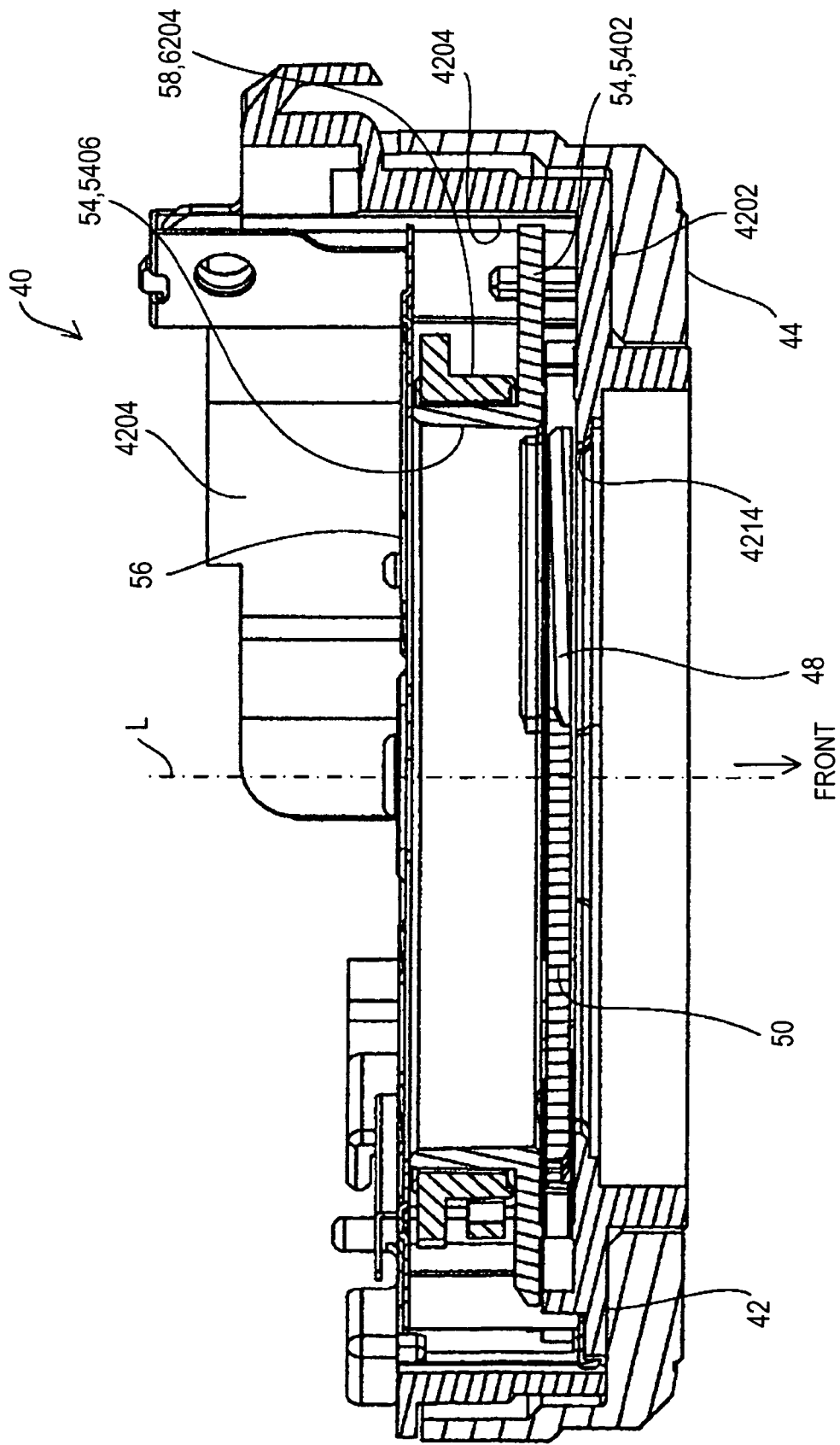
FIG. 10 is a cross section taken on line D-D of FIG. 7.

FIG. 7 is a rear view of the lens barrier device 40. FIG. 8 is a cross section taken on line B-B of FIG. 7. FIG. 9 is a cross section taken on line C-C of FIG. 7. FIG. 10 is a cross section taken on line D-D of FIG. 7.

Figure 11:
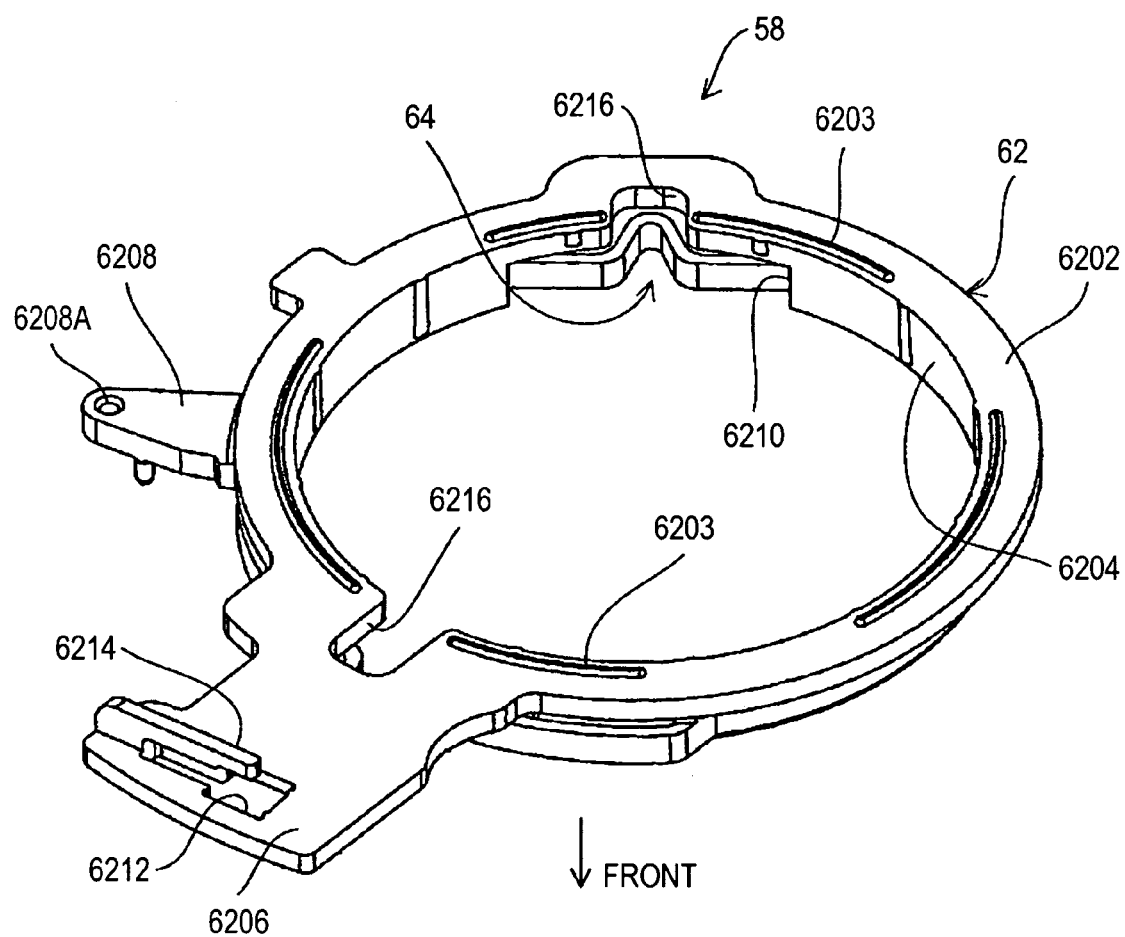
FIG. 11 is a perspective view of a drive ring when viewed from the rear.
Figure 12:
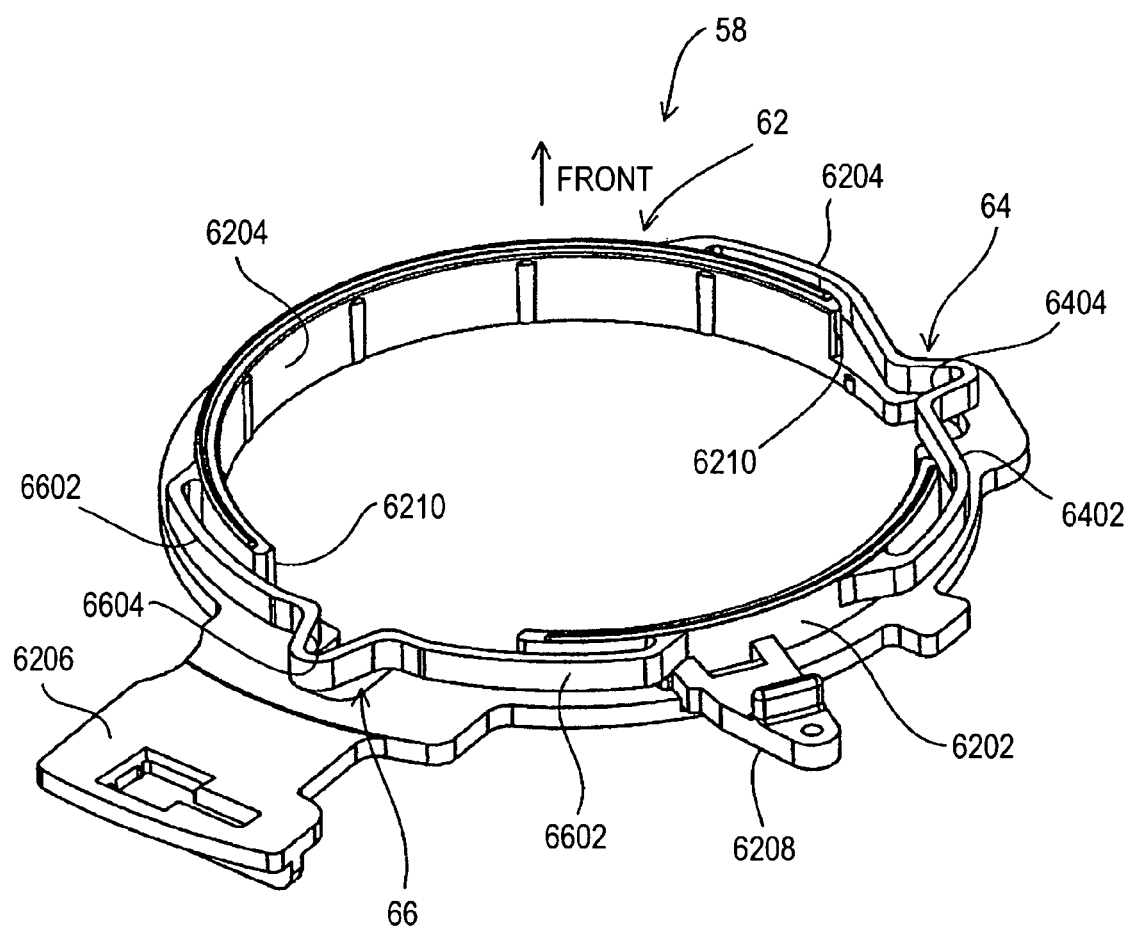
FIG. 12 is a perspective view of the drive ring when viewed from the front.
Figure 13:
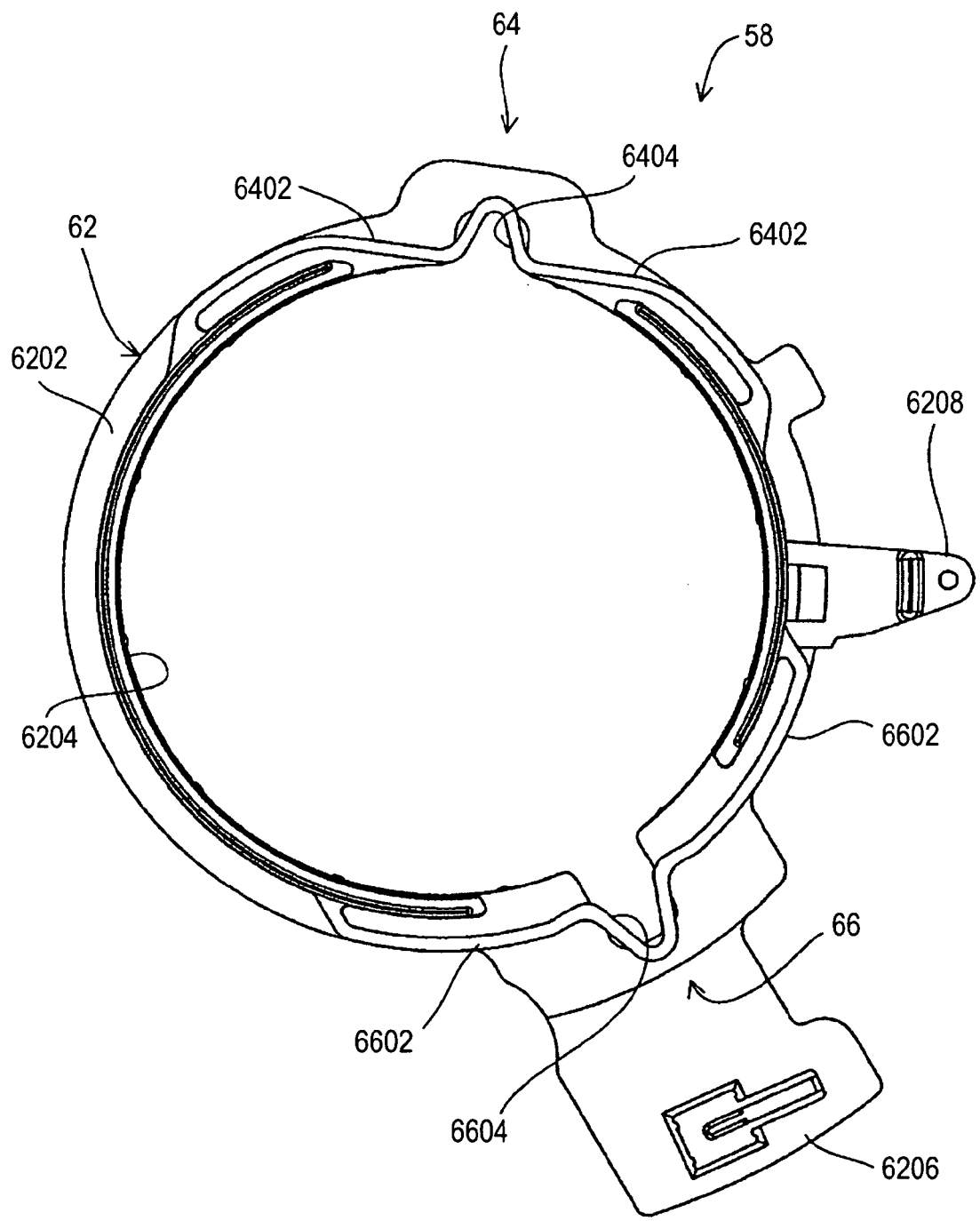
FIG. 13 is a plan view of the drive ring.

FIG. 11 is a perspective view of a drive ring 58 when viewed from the rear. FIG. 12 is a perspective view of the drive ring 58 when viewed from the front. FIG. 13 is a plan view of the drive ring 58.

Figure 14:
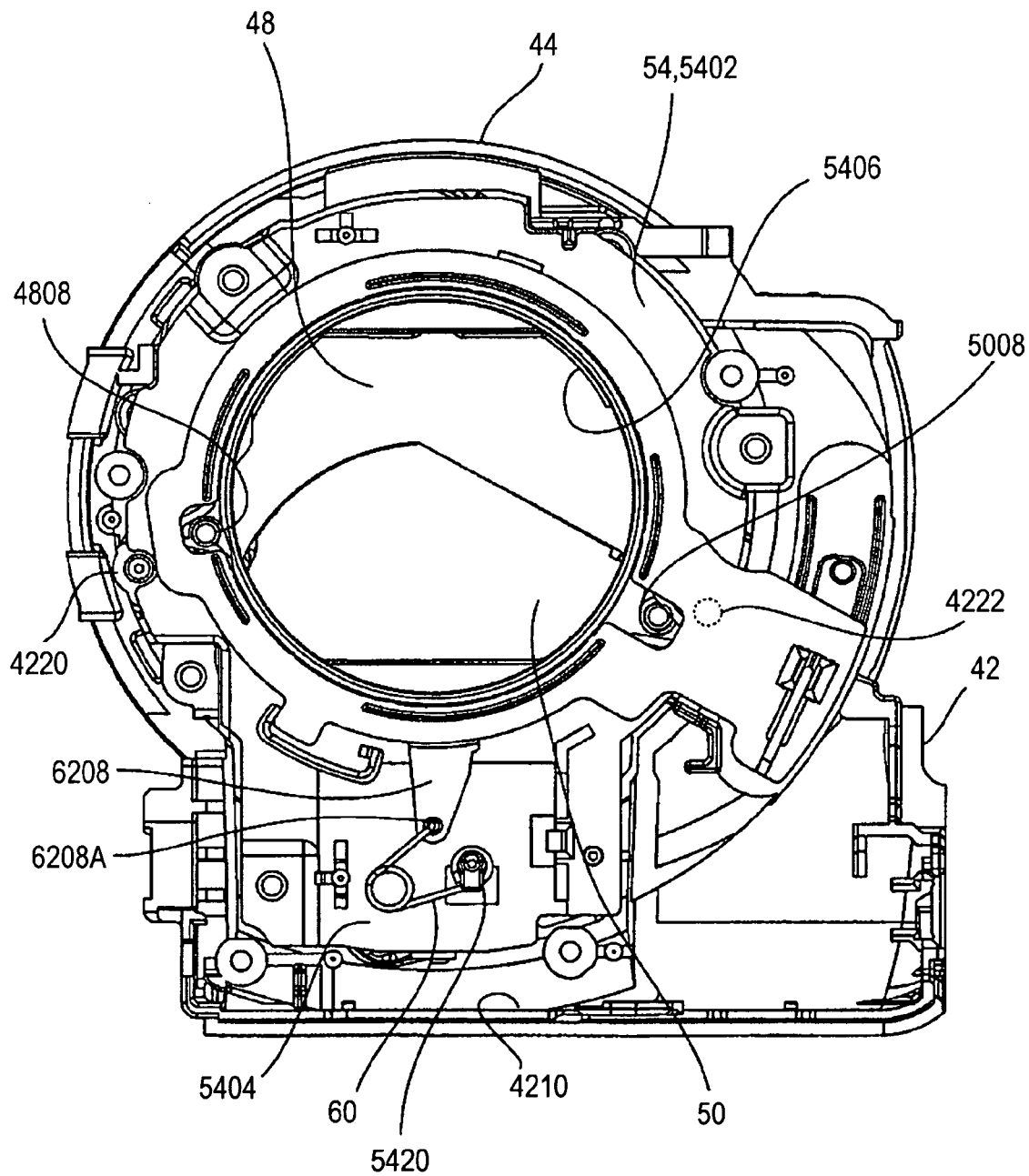
FIG. 14 is a rear view showing a state where first and second barrier blades, a blade presser, and the drive ring are assembled to a cabinet.

FIG. 14 is a rear view showing a state where first and second barrier blades 48 and 50, a blade presser 54, and the drive ring 58 are assembled to a cabinet 42.

Figure 15:
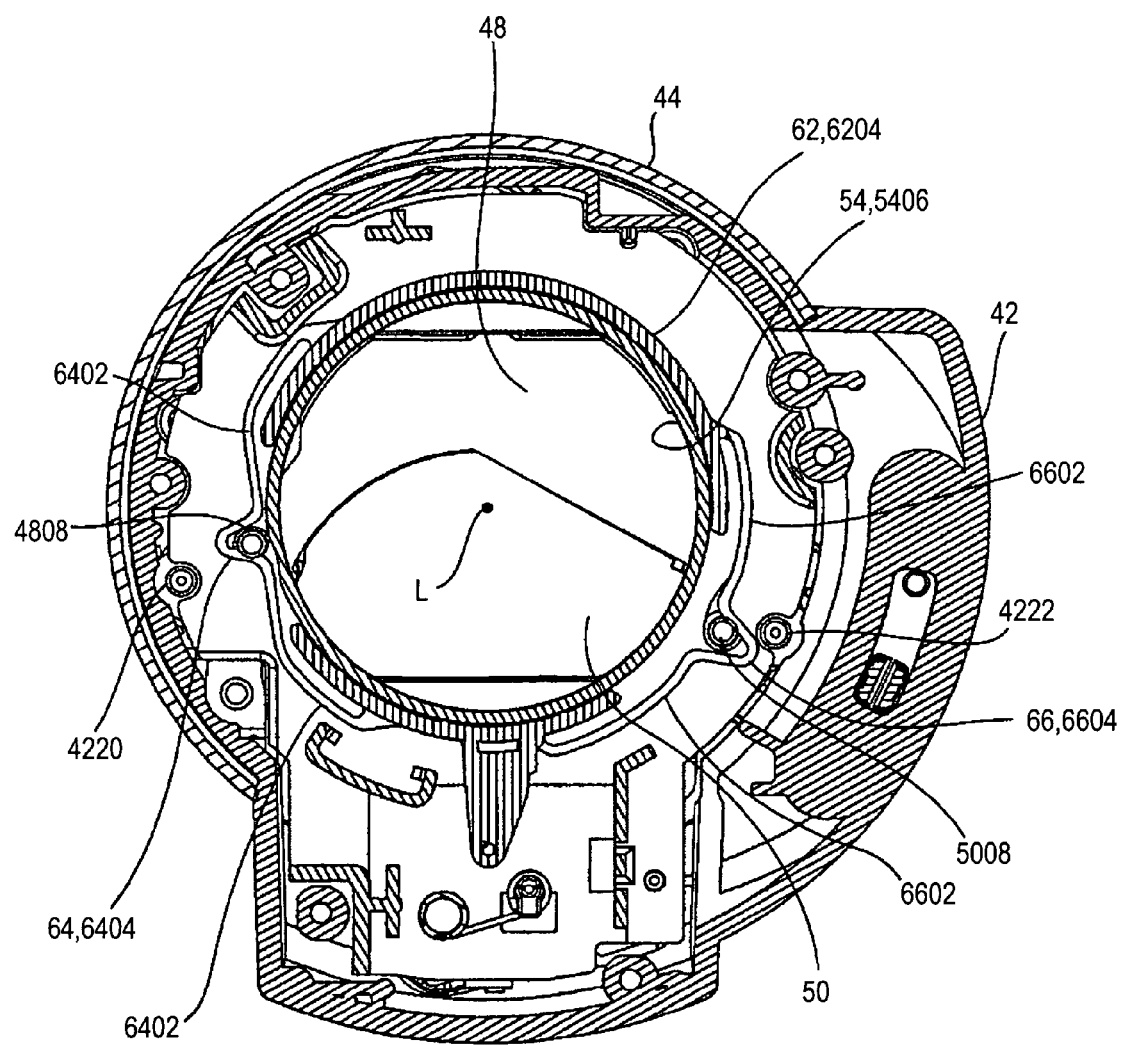
FIG. 15 is a cross section of the assembly of FIG. 14 along a plane orthogonal to an optical axis of an imaging optical system.

FIG. 15 is a cross section of the assembly of FIG. 14 along a plane orthogonal to the optical axis L of the imaging optical system 14.

Figure 16:
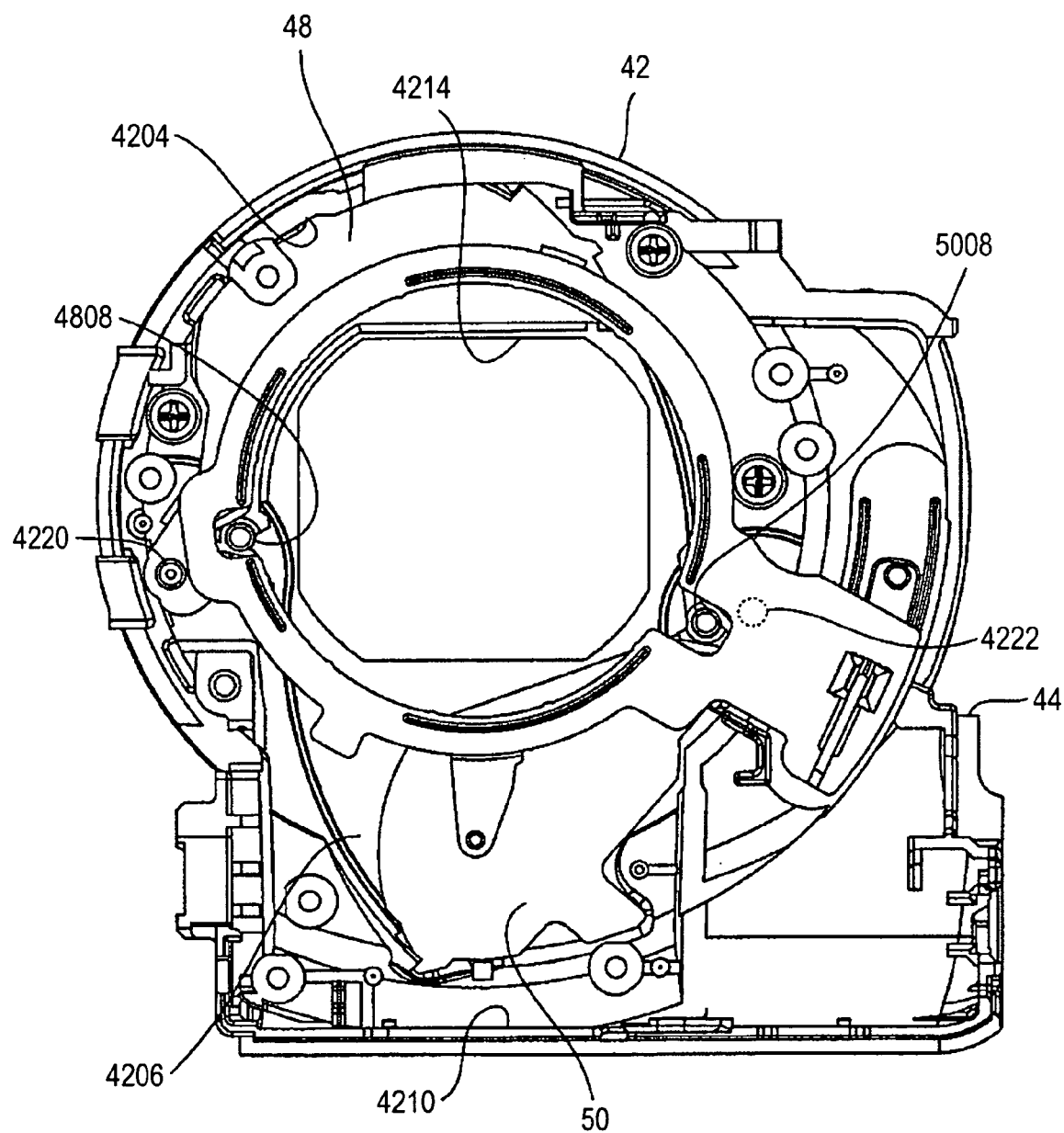
FIG. 16 is a rear view of the assembly of FIG. 14 in a state where the blade presser is omitted and the first and second barrier blades are positioned at the open position.

FIG. 16 is a rear view of the assembly of FIG. 14 in a state where the blade presser 54 is omitted and the first and second barrier blades 48 and 50 are positioned at the open position.

Figure 17:
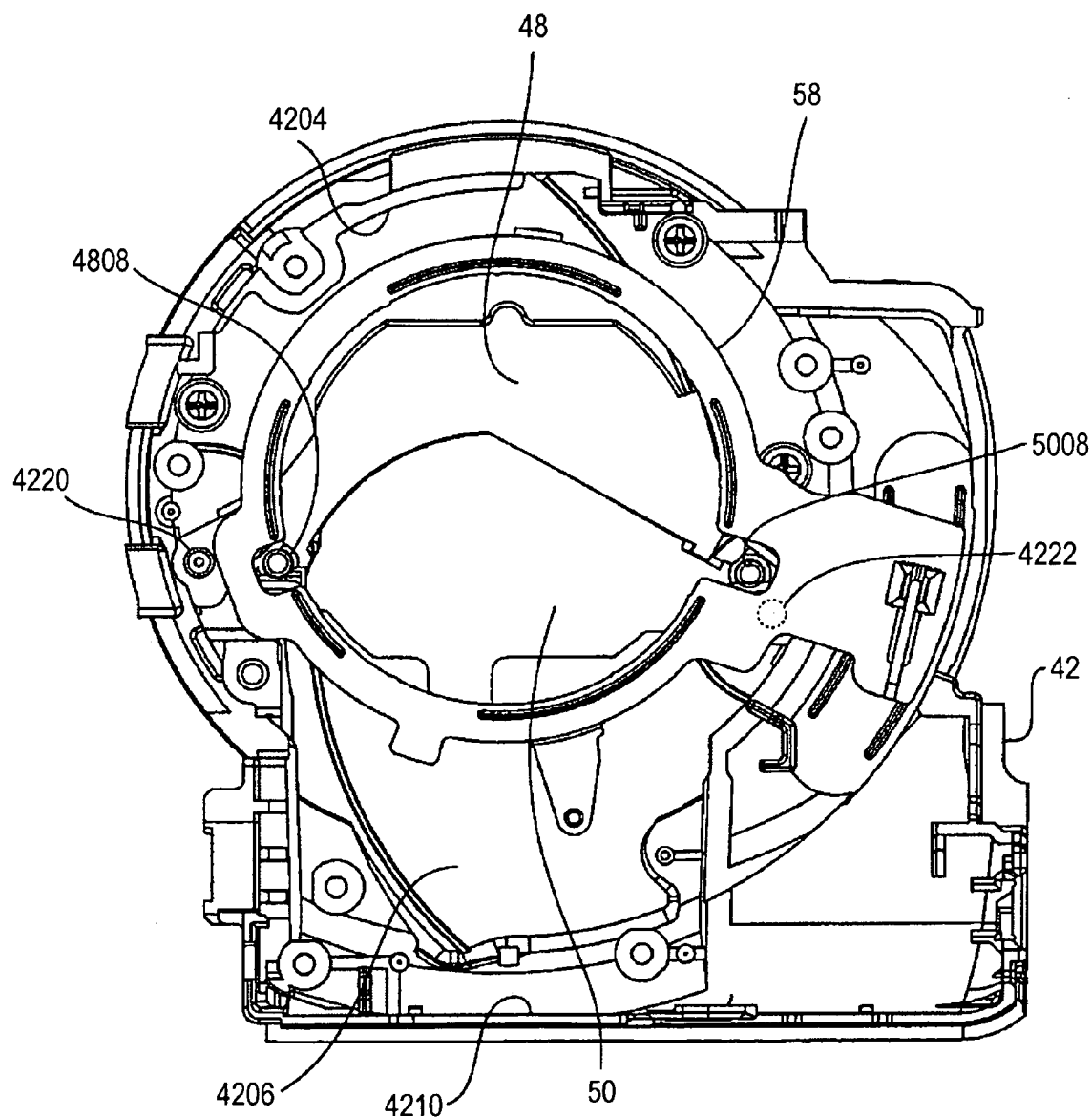
FIG. 17 is a rear view of the assembly of FIG. 14 in a state where the blade presser is omitted and the first and second barrier blades are positioned at the close position.

FIG. 17 is a rear view of the assembly of FIG. 14 in a state where the blade presser 54 is omitted and the first and second barrier blades 48 and 50 are positioned at the close position.

Figure 18:
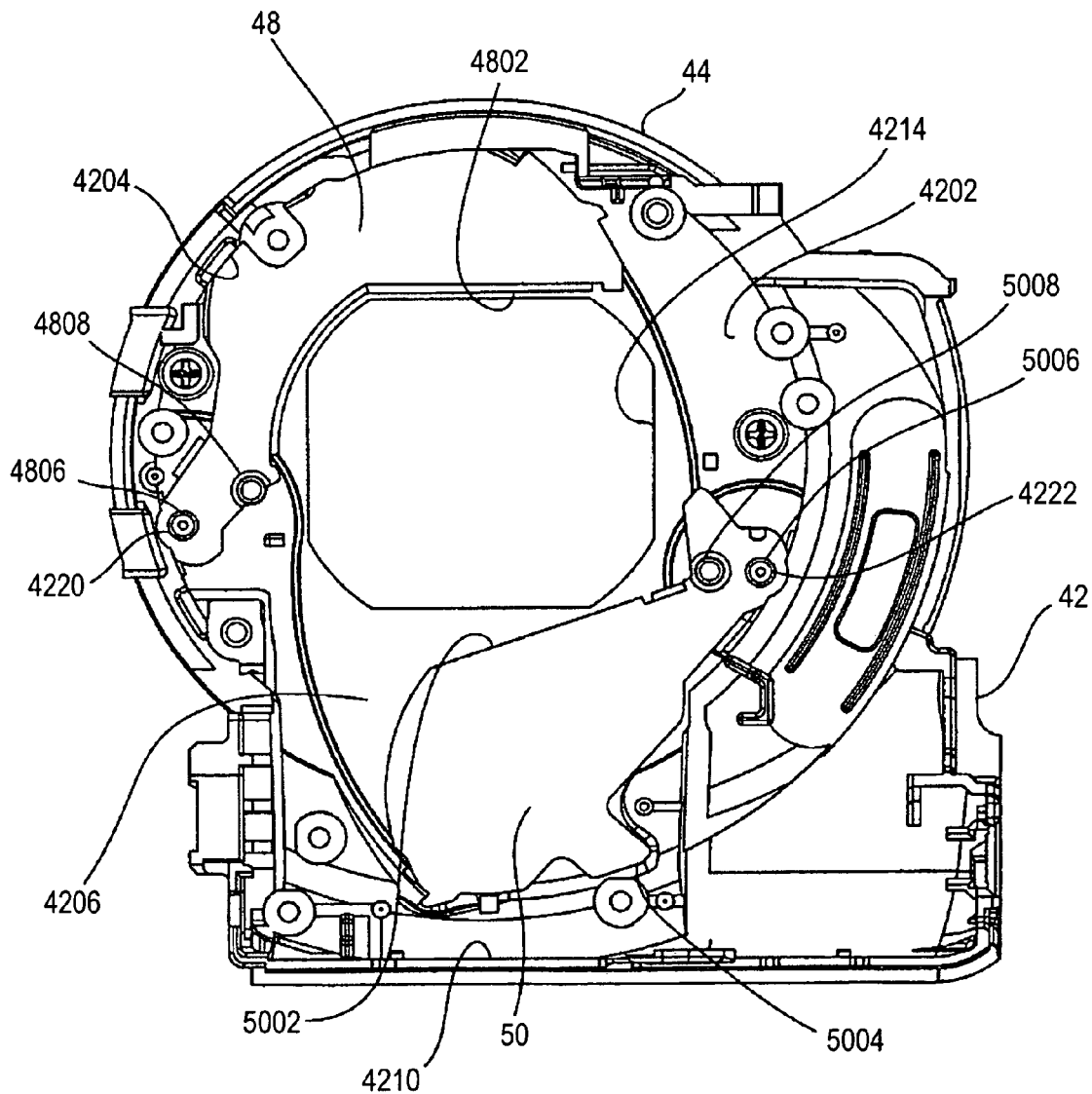
FIG. 18 is a rear view showing the open position of the first and second barrier blades.
Figure 19:
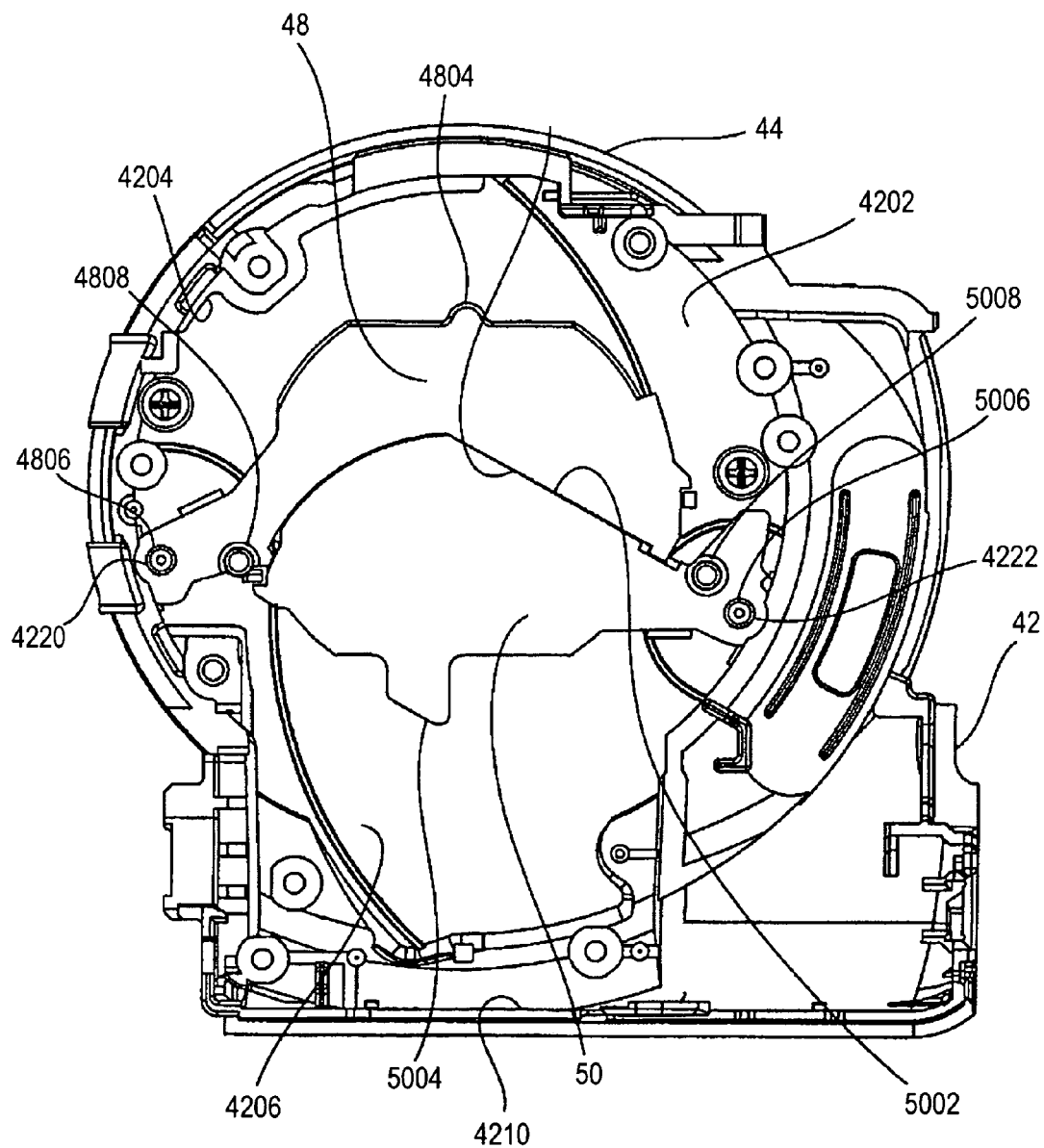
FIG. 19 is a rear view showing the close position of the first and second barrier blades.

FIG. 18 is a rear view showing the open position of the first and second barrier blades 48 and 50. FIG. 19 is a rear view showing the close position of the first and second barrier blades 48 and 50.

Figure 20:
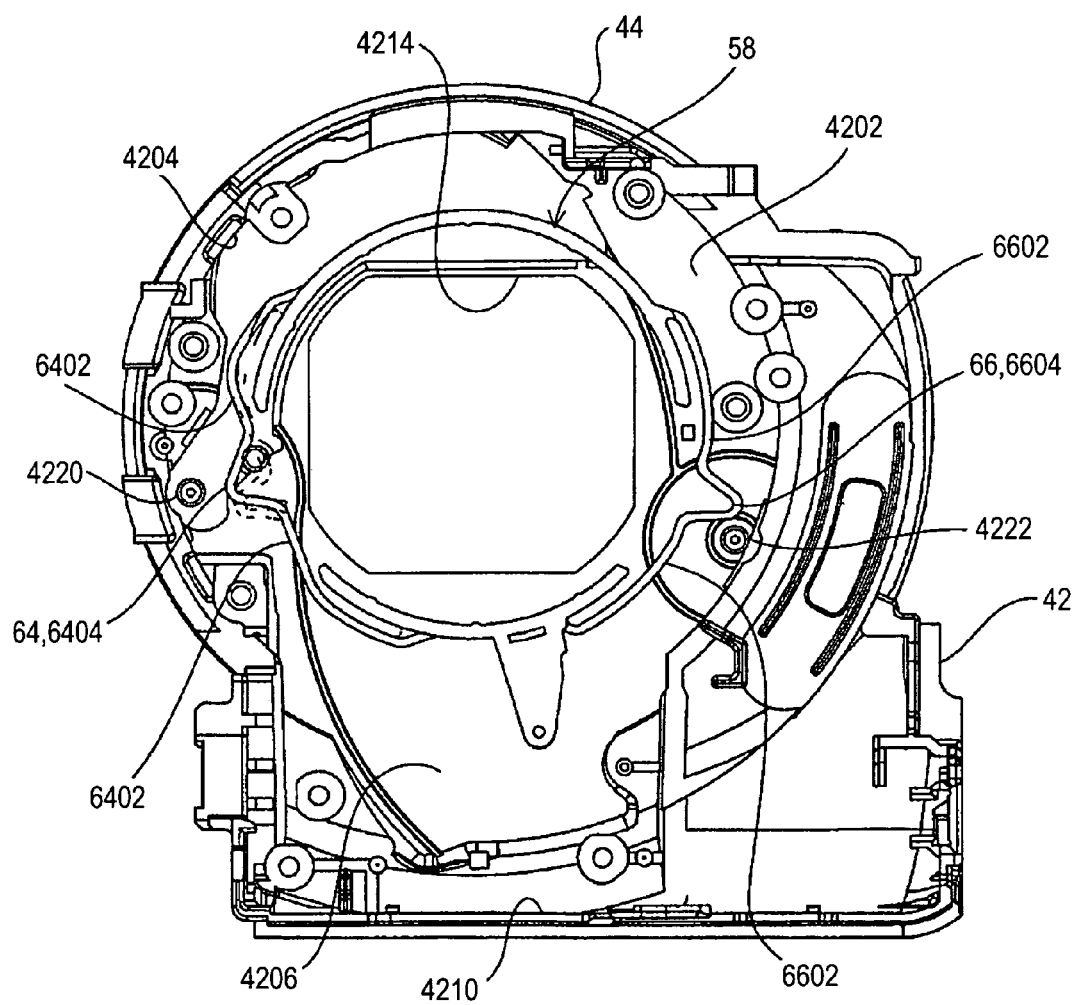
FIG. 20 is a view used to describe a state where a first coupling portion is deformed when the first barrier blade at the close position is directly and forcedly moved to the open position.

FIG. 20 is a view used to describe a state where a first coupling portion 64 is deformed when the first barrier blade 48 at the close position is directly and forcedly moved to the open position.

As has been described, the lens barrier device 40 is provided to the barrel portion 15.

The front portion of the barrel portion 15 will now be described with reference to FIG. 1 and FIG. 3 through FIG. 6.

As is shown in FIG. 1, the cabinet 42 is attached to the housing 12 so as to cover a notch portion of the housing 12 in the upper front portion and a decorative ring 44 is attached to the frontal surface of the cabinet 42.

The cabinet 42 and the decorative ring 44 together form a part of the front portion of the barrel portion 15 and the frontal surface of the housing 12, and the lens barrier device 40 is disposed in rear of the cabinet 42.

The cabinet 42 is made of synthetic resin, and as are shown in FIG. 3 through FIG. 6, it includes a ring plate portion 4202, a cylindrical portion 4204, a lower plate portion 4206, a side plate portion 4208, and a bottom plate portion 4210.

A cylinder portion 4212 is provided to the inner peripheral portion of the frontal surface of the ring plate portion 4202 so as to protrude frontward. Also, a rectangular opening portion 4214 for an optical path of the imaging optical system 14 is provided at the rear end of the cylinder portion 4212 on the inner side in the radial direction.

On the rear surface of the ring plate portion 4202, a first spindle 4220 serving as an oscillation supporting point of the first barrier blade 48 is provided in the form of a protrusion and a second spindle 4222 serving as an oscillation supporting point of the second barrier blade 50 is provided in the form of a protrusion.

The cylindrical portion 4204 protrudes rearward from the ring plate portion 4202 in the outer peripheral portion other than the lower portion.

The lower plate portion 4206 extends downward from the lower portion of the ring plate portion 4202.

As are shown in FIG. 3 through FIG. 6, the side plate portion 4208 widens outward in the radial direction from a point in the cylindrical portion 4204 in close proximity to the lower plate portion 4206.

The side plate portion 4208 is provided with a concave portion 4216 to accommodate a tab 46, which is an operation member used for an operation to open and close the first and second barrier blades 48 and 50, in such a manner that the tab 46 is movable on the circumference about the optical axis L of the imaging optical system 14 within a predetermined angular range about the optical axis L.

At the center of the concave portion 4216 is provided a notch portion 4218 (FIG. 4) to couple the knob 46 to the first and second barrier blades 48 and 50.

The bottom plate portion 4210 extends rearward from the lower ends of the lower plate portion 4206 and the side plate portion 4208.

The decorative ring 44 is made of a metal material, such as aluminum, or synthetic resin and, as are shown in FIG. 3 through FIG. 6, it has a ring plate portion 4402 and a cylindrical portion 4404.

As is shown in FIG. 9, the ring plate portion 4402 is fit to the frontal surface of the ring plate portion 4202 of the cabinet 42 and the cylinder portion 4212 is inserted inside the opening of the ring plate portion 4402.

As are shown in FIG. 3 through FIG. 6, the cylindrical portion 4404 is used to cover the cylindrical portion 4204 of the cabinet 42.

The cylindrical portion 4404 is provided with a lower plate notch portion 4406 through which the lower plate portion 4206 is exposed and a side plate notch portion 4408 through which the side plate portion 4208 is exposed.

A part of the cylindrical portion 4404 opposing the lower plate notch 4406 is formed in an extending portion 4410 that extends rearward further than the other portions.

As is shown in FIG. 1, the cabinet 42 is attached to the housing 12 at the upper front portion and the decorative ring 44 is attached to the cabinet 42. In this state, the ring plate portion 4402 and the cylindrical portion 4404 of the decorative ring 44, the side plate portion 4208, the lower plate portion 4206, and the bottom plate portion 4210 together form the surface of the housing 12.

As are shown in FIG. 4 through FIG. 6, the lens barrier device 40 includes a plurality of barrier blades, an oscillating mechanism 52, the blade presser 54, and a ring presser 56.

Herein, the barrier blades are two barrier blades: the first barrier blade 48 and the second barrier blade 50.

The first barrier blade 48 is made of synthetic resin.

The first barrier blade 48 is provided to the rear surface of the ring plate portion 4204 so as to open and close substantially the entire upper half of the optical path of the imaging optical system 14, whereas the second barrier blade 50 is provided to the rear surfaces of the ring plate portion 4204 and the lower plate portion 4206 so as to open and close substantially the entire lower half of the optical path.

The first and second barrier blades 48 and 50 are disposed in front of an objective lens, which is an imaging lens positioned in closest proximity to a subject side in the imaging optical system 14.

As are shown in FIG. 18 and FIG. 19, the second barrier lens 50 is formed in a larger outline form than the first barrier blade 48.

The first barrier blade 48 assumes an arc shape. One of the edges of the first barrier blade 48 in the width direction engages with the second barrier blade 50 and forms an engagement portion 4802 that blocks the optical path.

In addition, an abutting portion 4804 that abuts on the cylindrical portion 4204 of the cabinet 42 while the optical path is in a fully opened state is provided to the other edge of the first barrier blade 48 in the width direction. The first barrier blade 48 is positioned while the optical path is in a fully opened state by the abutment of the abutting portion 4804 on the cylindrical portion 4204.

The first barrier blade 48 has a spindle hole 4806 interlocked with the first spindle 4220 in a rotatable manner and a first drive pin 4808 provided in close proximity to the spindle hole 4806 and used to oscillate the first barrier blade 48.

The first barrier blade 48 is disposed in such manner that it is supported on the first spindle 4220 inserted through the spindle hole 4806 in an oscillatible manner and accommodated inside the cylindrical portion 4204 while the optical path is in a fully opened state.

The second barrier blade 50 is made of synthetic resin.

As are shown in FIG. 18 and FIG. 19, the second barrier blade 50 assumes an arc shape. One of the edges of the second barrier blade 50 in the width direction engages with the first barrier blade 48 and forms an engagement portion 5002 that blocks the optical path.

In addition, an abutting portion 5004 that abuts on the cylindrical portion 4204 of the cabinet 42 while the optical path is in a fully opened state is provided to the other edge of the second barrier blade 50 in the width direction. The second barrier blade 50 is positioned while the optical path is in a fully opened state by the abutment of the abutting portion 5004 on the cylindrical portion 4204.

The second barrier blade 50 has a spindle hole 5006 interlocked with the second spindle 4222 in a rotatable manner and a second drive pin 5008 provided in close proximity to the spindle hole 5006 and used to oscillate the second barrier blade 50.

The second barrier blade 50 is disposed in such a manner that it is supported on the second spindle 4222 inserted through the spindle hole 5006 in an oscillatible manner and accommodated above the bottom plate portion 4210 in the rear of the lower plate portion 4206 while the optical path is in a fully opened state.

As are shown in FIG. 7 through FIG. 10, the blade presser 54 is provided to the rear surfaces of the ring plate portion 4202 and the lower plate portion 4206 of the cabinet 42 so as to cover the first and second barrier blades 48 and 50 disposed in the manner described above.

The blade presser 54 is made of synthetic resin and has a ring plate portion 5402, a lower plate portion 5404 provided to protrude from the ring plate portion 5402, and a cylinder portion 5406 provided to protrude rearward from the inner periphery of the ring plate portion 5402.

As are shown in FIG. 4 and FIG. 5, the ring plate portion 5402 is provided with a long groove 5410 through which the first drive pin 4808 is inserted and another long groove 5412 through which the second drive pin 5008 is inserted.

As will be described below, the blade presser 54 together with the ring presser 56 is attached to the cabinet 42 with screws 2 that are inserted through respective attachment portions 5408. The first and second barrier blades 48 and 50 are thus supported on the cabinet 42 and the blade presser 54 in an oscillatible manner.

The oscillating mechanism 52 allows a plurality of barrier blades to oscillate so that the barrier blades form a fully closed state in which the optical path of the imaging optical system 14 is fully closed and a fully opened state in which the optical path is fully opened.

More specifically, the oscillating mechanism 52 allows the first and second barrier blades 48 and 50 to oscillate so that the first and second barrier blades 48 and 50 form a fully closed state in which the optical path of the imaging optical system 14 is fully closed and a fully opened state in which the optical path is fully opened.

As are shown in FIG. 4 and FIG. 5, the oscillating mechanism 52 includes the drive ring 58 and a pushing mechanism.

The drive portion 58 is made of synthetic resin and molded with a forming die.

The drive ring 58 is provided in a reversely rotatable manner within a predetermined angular range about the optical path L of the imaging optical system 14 and allows a plurality of barrier blades to oscillate back and forth to form a fully closed state and a fully opened state by rotating forward and backward.

More specifically, the drive ring 58 is provided in a reversely rotatable manner within a predetermined angular range about the optical axis L and allows the first and second barrier blades 48 and 50 to oscillate back and forth to form a fully closed state and a fully opened state by rotating forward and backward.

As are shown in FIG. 11 through FIG. 13, the drive ring 58 includes a main body portion 62, a first coupling portion 64, and a second coupling portion 66.

The main body portion 62 includes a ring plate portion 6202, a cylinder portion 6204, a coupling piece 6206, and a stopper piece 6208.

The ring plate portion 6202 is formed in a ring shape about the optical axis L.

As is shown in FIG. 11, rails 6203 that let the drive ring 58 rotate smoothly are provided in the form of protrusions on the rear surface of the ring plate portion 6202.

As is shown in FIG. 12, the cylinder portion 6204 is provided to protrude rearward from the inner periphery of the ring plate portion 6202.

Notch portions 6210 are provided to the cylinder portion 6204 at two points in the circumferential direction.

The coupling piece 6206 is provided to protrude from the outer periphery of the ring plate portion 6202 and it is the point coupled to the knob 46.

As is shown in FIG. 11, a notch portion 6212 is provided in the tip portion of the coupling piece 6206 and a stopper piece 6214 is provided to be positioned above the notch portion 6212.

As are shown in FIG. 3 and FIG. 4, the tab 46 is disposed in the concave portion 4216 of the cabinet 42 and a tip portion 4604 of a leg portion 4602 of the tab 46 shown in FIG. 6 passes through the notch portion 4218. The tip portion 4604 is inserted into the notch portion 6212 of the coupling piece 6206 shown in FIG. 11. Meanwhile, as are shown in FIG. 7 and FIG. 9, the stopper piece 6214 is inserted into the groove portion 4606 of the tip portion 4604. The tab 46 and the stopper piece 6214 are thus coupled to each other.

Accordingly, an operation to oscillate the tab 46 causes the drive ring 58 to rotate forward and backward (oscillates) via the coupling piece 6206.

As are shown in FIG. 11 through FIG. 13, the stopper piece 6208 is provided to protrude from the outer periphery of the ring plate portion 6202. As is shown in FIG. 14, the stopper piece 6208 is a point at which a toggle spring 60 is stopped.

As is shown in FIG. 11, a stopper hole 6208A to stop the toggle spring 60 is provided in the tip portion of the stopper piece 6208.

As is shown in FIG. 10, the drive ring 58 is disposed in such a manner that the inner peripheral surface of the cylinder portion 6204 is supported in a rotatable manner on the outer peripheral surface of the cylinder portion 5406 of the blade presser 54 and the tip end surface of the cylinder portion 6204 is in contact with the rear surface of the ring plate portion 5402 in a rotatable manner.

As are shown in FIG. 12 and FIG. 13, the first coupling portion 64 is provided to the main body portion 62 and the first coupling portion 64 is coupled to the first drive pin 4808 of the first barrier blade 48 that is exposed from the long groove 5410 of the blade presser 54 as shown in FIG. 4.

The first coupling portion 64 is a point that not only allows the first barrier blade 48 to oscillate back and forth between the close position at which a fully closed state is formed and the open position at which a fully opened state is formed in association with forward and backward rotations of the main body portion 62, but also undergoes elastic deformation when the first barrier blade 48 is directly and forcedly moved from the close position to the open position.

As are shown in FIG. 12 and FIG. 13, the first coupling portion 64 has an arm portion 6402 and an engagement portion 6404.

The arm portion 6402 extends in an arc shape about the optical axis L at a point outside the cylinder portion 6204 of the main body portion 62 in the radial direction and the both ends thereof are coupled to the cylinder portion 6204.

The first coupling portion 64 is provided to the cylinder portion 6204 at a point so as to lie across one of the notch portions 6210.

The engagement portion 6404 is provided to the arm portion 6402 at an intermediate portion in the extending direction and it is formed of a V-shaped piece that is open in the direction of the optical axis L. The first drive pin 4808 engages with the engagement portion 6404.

The first coupling portion 64 is provided to a point positioned in rear of the front end of the cylinder portion 6204 and in front of the rear end of the cylinder portion 6204. Hence, as is shown in FIG. 9, a clearing is secured between the first coupling portion 64 and the rear surface of the ring plate portion 5402 while the drive ring 58 is disposed at the cylinder portion 5406.

Herein, when the first barrier blade 48 is directly and forcedly moved from the close position to the open position, as is shown in FIG. 20, the arm portion 6402 and the engagement portion 6404 undergo elastic deformation. Herein, the main body portion 62 remains intact in this instance.

As are shown in FIG. 12 and FIG. 13, the second coupling portion 66 is provided to the main body portion 62. The second coupling portion 66 is coupled to the second drive pin 5008 of the second barrier blade 50 exposed from the long groove 5412 of the blade presser 54 as is shown in FIG. 5.

The second coupling portion 66 is a portion that not only allows the second barrier blade 50 to oscillate back and forth between the close position and the open position in association with forward and backward rotations of the main body portion 62, but also undergoes elastic deformation when the second barrier blade 50 is directly and forcedly moved from the close position to the open position.

As are shown in FIG. 12 and FIG. 13, the second coupling portion 66 has an arm portion 6602 and an engagement portion 6604.

The arm portion 6602 extends in an arc shape about the optical axis L at a point outside the cylinder portion 6204 of the main body portion 62 in the radial direction and the both ends thereof are coupled to the cylinder portion 6204.

The second coupling portion 66 is provided to the cylinder portion 6204 at a point so as to lie across the other notch portion 6210.

The engagement portion 6604 is provided to the arm portion 6602 at an intermediate portion in the extending direction and it is formed of a V-shaped piece that is open in the direction of the optical axis L. The second drive pin 5008 engages with the engagement portion 6604.

As is shown in FIG. 11, notch portions 6216 necessary to mold the drive ring 58 with a forming die are provided to the ring plate portion 6202 in the inner peripheral portion at two points respectively corresponding to the two engagement portions 6404 and 6604.

The second coupling portion 66 is provided at a point positioned in rear of the front end of the cylinder portion 6204 and in front of the rear end of the cylinder portion 6204. Accordingly, a clearing is secured between the second coupling portion 66 and the rear surface of the ring plate portion 5402 while the drive ring 58 is disposed at the cylinder portion 5406.

Herein, as with the first coupling portion 64, the arm portion 6602 and the engagement portion 6604 undergo elastic deformation when the second barrier blade 50 is directly and forcedly moved from the close position to the open position. Herein, the main body portion 62 remains intact in this instance.

Also, herein, as is shown in FIG. 15, a distance from the optical axis L to the first drive pin 4808 and a distance from the optical axis L to the second drive pin 5008 are different. Corresponding to this configuration, a distance from the optical axis L to the engagement portion 6404 of the first coupling portion 64 and a distance from the optical axis L to the engagement portion 6604 of the second coupling portion 66 are also different. In other words, it is configured in such a manner that the second barrier blade 50 is allowed to oscillate in a larger stroke than the first barrier blade 48 in association with forward and backward rotations of the drive ring 58.

Herein, a distance from the spindle hole 4806 serving as the supporting point of the first barrier blade 48 to the first drive pin 4808 is set to be larger than a distance from the spindle hole 5006 serving as the supporting point of the second barrier blade 50 to the second drive pin 5008. Owing to this configuration, the second barrier blade 50 is allowed to oscillate in a larger stroke than the first barrier blade 48 in association with forward and backward rotations of the drive ring 58.

The pushing mechanism pushes the first and second barrier blades 48 and 50 so as to be positioned selectively at either the close position at which a fully closed state is formed or the open position at which a fully opened state is formed.

As is shown in FIG. 14, the pushing mechanism is formed of the single toggle spring 60 provided between the blade presser 54 and the drive ring 58 that together form a part of the barrel portion 15.

To be more specifically, the toggle spring 60 is disposed in such a manner that one end thereof is stopped in the stopper hole 6208A while the other end is stopped at a stopper shaft 5420 of the blade presser 54.

As are shown in FIG. 7 through FIG. 10, the ring presser 56 is provided to cover the drive ring 58 supported on the cylinder portion 5406 in a reversely rotatable manner.

The ring presser 56 is formed of a steel plate.

As is shown in FIG. 7, the ring presser 56 includes a ring plate portion 5602 and a lower plate portion 5604.

As is shown in FIG. 4, the ring presser 56 together with the blade presser 54 is attached to the cabinet 42 by placing the screws 2 inserted into attachment portions 5606 of the ring presser 56 and the attachment portions 5408 of the blade presser 54 into screw holes 4230 of the cabinet 42.

The rails 6203 of the drive ring 58 come into contact with the ring plate portion 5602 of the ring presser 56 in a rotatable manner while the ring presser 56 is attached as described above. The drive ring 58 is thus provided to the cabinet 42.

Herein, the drive ring 58 oscillates as the tab 46 is operated to oscillate.

In association with the oscillations of the drive ring 58, the first and second barrier blades 48 and 50 are allowed to oscillate back and forth to form a fully opened state (FIG. 16 and FIG. 18) and a fully closed state (FIG. 17 and FIG. 19).

The first and second barrier blades 48 and 50 are pushed by the toggle spring 60 to selectively form a fully opened state or a fully closed state of the optical path. The fully closed state and the fully opened state are therefore maintained in a stable manner.

Also, because the first and second coupling portions 64 and 66 are allowed to undergo elastic deformation, they undergo elastic deformation in a fully closed state and a fully opened state because of the toggle spring 60, albeit slightly. In addition, elastic forces of the first and second coupling portions 64 and 66 acts on the first and second barrier blades 48 and 50, respectively, which is advantageous in maintaining a fully closed state and a fully opened state formed by the first and second barrier blades 48 and 50 in a more stable manner.

Suppose a case where an external force of some sort acts on the first barrier blade 48 positioned at the close position and the first barrier blade 48 is forced to oscillate to the open position. In this case, as is shown in FIG. 20, the main body portion 62 remains intact and the external force is absorbed by the elastic deformation of the first coupling portion 64.

Likewise, suppose a case where an external force of some sort acts on the second barrier blade 50 positioned at the close position and the second barrier blade 50 is forced to oscillate to the open position. In this case, too, the main body portion 62 remains intact and the external force is absorbed by the elastic deformation of the second coupling portion 66 as in the case described above.

It thus becomes possible to prevent damages on the members included in the oscillating mechanism 52, such as the drive ring 58 and the tab 46, which is advantageous in enhancing the durability.

It is configured in such a manner that the two barrier blades 48 and 50 are oscillated by the single drive ring 58. Accordingly, it is sufficient to provide the single toggle spring as the pushing mechanism that pushes the first and second barrier blades 48 and 50 to selectively form a fully closed state and a fully opened state. The number of components can be therefore reduced, which is advantageous in reducing the cost.

Herein, descriptions have been given to a case where each coupling portion includes the arm portion and the engagement portion formed of a V-shaped piece provided to the arm portion at an intermediate portion in the extending direction. It should be appreciated, however, that the coupling portion can be of a variety of structures. In short, it is sufficient for the coupling portion to have a structure that allows the barrier blades to oscillate back and forth between the close position at which a fully closed state is formed and the open position at which a fully opened state is formed and to undergo elastic deformation when the barrier blades are directly forced to oscillate from the close position to the open position. It should be noted, however, that when structured in the manner described above, the components can be molded as one piece using a forming die, which is advantageous in reducing the cost.

Herein, descriptions have been given to a case where the imaging device is a video camera. It should be appreciated, however, that the present invention is applicable to a wide variety of imaging devices, such as a digital still camera, a mobile phone with camera, and a monitoring camera device.

It should be understood by those skilled in the art that various modifications, combinations, sub-combinations and alterations may occur depending on design requirements and other factors insofar as they are within the scope of the appended claims or the equivalents thereof.

What is claimed is:

1. A lens barrier device comprising:
   a plurality of barrier blades disposed in an oscillatible manner in front of an imaging lens positioned in closest proximity to a subject side in an imaging optical system; and
   an oscillating mechanism that allows the plurality of barrier blades to oscillate so as to form a fully closed state in which an optical path of the imaging optical system is fully closed and a fully opened state in which the optical path is fully opened by the barrier blades,
   wherein the oscillating mechanism includes a drive ring that is provided in an inversely rotatable manner within a predetermined angular range about an optical axis of the imaging optical system and allows the plurality of barrier blades to oscillate back and forth to form the fully closed state and the fully opened state by rotating forward and backward, and
   the drive ring includes
   a main body portion that extends in a ring shape around the optical axis, and
   a plurality of coupling portions that are provided to the main body portion and coupled to the respective barrier blades so as to allow the respective barrier blades to oscillate back and forth between a close position at which the fully closed state is formed and an open position at which the fully opened state is formed in association with forward and backward rotations of the main body portion and undergo elastic deformation when the respective barrier blades are directly forced to oscillate from the close position to the open position,
   wherein
   each barrier blade is provided with a drive pin that protrudes rearward;
   the drive ring is disposed in rear of the plurality of barrier blades; and
   each of the plurality of coupling portions has an arm portion extending in an arc shape about the optical axis and coupled to the main body portion at both ends and an engagement portion provided to the arm portion at an intermediate portion in an extending direction and engaging with the drive pin of the corresponding barrier blade, and
   wherein
   the engagement portion is formed of a V-shaped piece opening in a direction of the optical axis, with which the drive pin is engaged; and
   each coupling portion undergoes elastic deformation due to both of the arm portion and the V-shaped piece.

2. The lens barrier device according to claim 1, wherein
   the oscillating mechanism has pushing means for pushing the plurality of barrier blades to be selectively positioned at one of a close position at which the fully closed state is formed and an open position at which the fully opened state is formed; and
   the pushing means is formed of a single toggle spring provided between a barrel portion that accommodates the imaging optical system and the drive ring.

3. The lens barrier device according to claim 2, wherein
   the oscillating mechanism further has an operation member used to operate the drive ring to rotate;
   the plurality of barrier blades are two barrier blades that form the fully closed state when the operation member is at a close position and the fully opened state when the operation member is at an open position; and
   the respective coupling portions undergo elastic deformation by a pushing force of the pushing means in the fully closed state so that the respective barrier blades are pushed to the close position by elastic forces of the respective coupling portions, and the respective coupling portions undergo elastic deformation by the pushing force of the pushing means in the fully opened state so that the respective barrier blades are pushed to the open position by the elastic forces of the respective coupling portions.

4. A lens barrier device comprising:
   a plurality of barrier blades disposed in an oscillatible manner in front of an imaging lens positioned in closest proximity to a subject side in an imaging optical system; and
   an oscillating mechanism that allows the plurality of barrier blades to oscillate so as to form a fully closed state in which an optical path of the imaging optical system is fully closed and a fully opened state in which the optical path is fully opened by the barrier blades,
   wherein the oscillating mechanism includes a drive ring that is provided in an inversely rotatable manner within a predetermined angular range about an optical axis of the imaging optical system and allows the plurality of barrier blades to oscillate back and forth to form the fully closed state and the fully opened state by rotating forward and backward, and
   the drive ring includes
   a main body portion that extends in a ring shape around the optical axis, and a plurality of coupling portions that are provided to the main body portion and coupled to the respective barrier blades so as to allow the respective barrier blades to oscillate back and forth between a close position at which the fully closed state is formed and an open position at which the fully opened state is formed in association with forward and backward rotations of the main body portion and undergo elastic deformation when the respective barrier blades are directly forced to oscillate from the close position to the open position, wherein each barrier blade is provided with a drive pin that protrudes rearward;

the drive ring is disposed in rear of the plurality of barrier blades; and each of the plurality of coupling portions has an arm portion extending in an arc shape about the optical axis and coupled to the main body portion at both ends and an engagement portion provided to the arm portion at an intermediate portion in an extending direction and engaging with the drive pin of the corresponding barrier blade, and wherein a distance from the optical axis to the drive pin is different from one barrier blade to another; and a distance from the optical axis to the engagement portion is different from one engagement portion to another in a corresponding manner.

5. A lens barrier device comprising:

a plurality of barrier blades disposed in an oscillatible manner in front of an imaging lens positioned in closest proximity to a subject side in an imaging optical system; and an oscillating mechanism that allows the plurality of barrier blades to oscillate so as to form a fully closed state in which an optical path of the imaging optical system is fully closed and a fully opened state in which the optical path is fully opened by the barrier blades, wherein the oscillating mechanism includes a drive ring that is provided in an inversely rotatable manner within a predetermined angular range about an optical axis of the imaging optical system and allows the plurality of barrier blades to oscillate back and forth to form the fully closed state and the fully opened state by rotating forward and backward, and the drive ring includes a main body portion that extends in a ring shape around the optical axis, and a plurality of coupling portions that are provided to the main body portion and coupled to the respective barrier blades so as to allow the respective barrier blades to oscillate back and forth between a close position at which the fully closed state is formed and an open position at which the fully opened state is formed in association with forward and backward rotations of the main body portion and undergo elastic deformation when the respective barrier blades are directly forced to oscillate from the close position to the open position, wherein each barrier blade is provided with a drive pin that protrudes rearward;

the drive ring is disposed in rear of the plurality of barrier blades; and each of the plurality of coupling portions has an arm portion extending in an arc shape about the optical axis and coupled to the main body portion at both ends and an engagement portion provided to the arm portion at an intermediate portion in an extending direction and engaging with the drive pin of the corresponding barrier blade, and wherein the main body portion has a cylinder portion about the optical axis;

the arm portion of each coupling portion extends at a point outside the cylinder portion in a radial direction;

a point at which the arm portion of each coupling portion is coupled to the main body portion is the cylinder portion; and each coupling portion is positioned in rear of a front end of the cylinder portion and in front of a rear end of the cylinder portion.

6. A lens barrel comprising:

a barrel portion that accommodates an imaging optical system and a lens barrier device;

wherein the lens barrier device includes a plurality of barrier blades disposed in an oscillatible manner in front of an imaging lens positioned in closest proximity to a subject side in the imaging optical system, and an oscillating mechanism that allows the plurality of barrier blades to oscillate so as to form a fully closed state in which an optical path of the imaging optical system is fully closed and a fully opened state in which the optical path is fully opened by the barrier blades, the oscillating mechanism including a drive ring that is provided in an inversely rotatable manner within a predetermined angular range about an optical axis of the imaging optical system and allows the plurality of barrier blades to oscillate back and forth to form the fully closed state and the fully opened state by rotating forward and backward, and the drive ring including a main body portion that extends in a ring shape around the optical axis, and a plurality of coupling portions that are provided to the main body portion and coupled to the respective barrier blades so as to allow the respective barrier blades to oscillate back and forth between a close position at which the fully closed state is formed and an open position at which the fully opened state is formed in association with forward and backward rotations of the main body portion and undergo elastic deformation when the respective barrier blades are directly forced to oscillate from the close position to the open position, wherein each barrier blade is provided with a drive pin that protrudes rearward;

the drive ring is disposed in rear of the plurality of barrier blades; and each of the plurality of coupling portions has an arm portion extending in an arc shape about the optical axis and coupled to the main body portion at both ends and an engagement portion provided to the arm portion at an intermediate portion in an extending direction and engaging with the drive pin of the corresponding barrier blade, and wherein the engagement portion is formed of a V-shaped piece opening in a direction of the optical axis, with which the drive pin is engaged; and each coupling portion undergoes elastic deformation due to both of the arm portion and the V-shaped piece.

7. An imaging device comprising:

an imaging optical system;

a lens barrier device; and a lens barrel having a barrel portion that accommodates the imaging optical system and the lens barrier device, wherein the lens barrier device includes a plurality of barrier blades disposed in an oscillatible manner in front of an imaging lens, positioned in closest proximity to a subject side in the imaging optical system, and an oscillating mechanism that allows the plurality of barrier blades to oscillate so as to form a fully closed state in which an optical path of the imaging optical system is fully closed and a fully opened state in which the optical path is fully opened by the barrier blades, the oscillating mechanism including a drive ring that is provided in an inversely rotatable manner within a predetermined angular range about an optical axis of the imaging optical system and allows the plurality of barrier blades to oscillate back and forth to form the fully closed state and the fully opened state by rotating forward and backward, and the drive ring including a main body portion that extends in a ring shape around the optical axis, and a plurality of coupling portions that are provided to the main body portion and coupled to the respective barrier blades so as to allow the respective barrier blades to oscillate back and forth between a close position at which the fully closed state is formed and an open position at which the fully opened state is formed in association with forward and backward rotations of the main body portion and undergo elastic deformation when the respective barrier blades are directly forced to oscillate from the close position to the open position, wherein each barrier blade is provided with a drive pin that protrudes rearward;

the drive ring is disposed in rear of the plurality of barrier blades; and each of the plurality of coupling portions has an arm portion extending in an arc shape about the optical axis and coupled to the main body portion at both ends and an engagement portion provided to the arm portion at an intermediate portion in an extending direction and engaging with the drive pin of the corresponding barrier blade, and wherein the engagement portion is formed of a V-shaped piece opening in a direction of the optical axis, with which the drive pin is engaged; and each coupling portion undergoes elastic deformation due to both of the arm portion and the V-shaped piece.

* * * * *